US008476360B2

(12) United States Patent
Tse et al.

(10) Patent No.: US 8,476,360 B2
(45) Date of Patent: Jul. 2, 2013

(54) CALENDERED FILMS OF PLASTICIZED BLENDS OF PLASTOMER AND IMPACT COPOLYMER

(75) Inventors: Mun F. Tse, Seabrook, TX (US); Bryan R. Chapman, Annandale, NJ (US); David B. Dunaway, Houston, TX (US); Bruce R. Lundmark, Akron, OH (US); Bruce A. Harrington, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 572 days.

(21) Appl. No.: 12/722,292

(22) Filed: Mar. 11, 2010

(65) Prior Publication Data

US 2011/0064931 A1 Mar. 17, 2011

Related U.S. Application Data

(63) Continuation-in-part of application No. 11/504,447, filed on Aug. 15, 2006, which is a continuation-in-part of application No. 10/782,228, filed on Feb. 19, 2004, now Pat. No. 7,531,594, which is a continuation-in-part of application No. 10/640,435, filed on Aug. 12, 2003, now Pat. No. 7,619,026, said application No. 10/782,228 is a continuation-in-part of application No. 10/634,351, filed on Aug. 4, 2003, now Pat. No. 7,632,887.

(60) Provisional application No. 60/402,665, filed on Aug. 12, 2002.

(51) Int. Cl.
*C08L 23/00* (2006.01)
*B32B 27/32* (2006.01)

(52) U.S. Cl.
USPC .......................................... 524/528; 428/220

(58) Field of Classification Search
USPC ........................................................ 524/528
See application file for complete search history.

(56) References Cited

U.S. PATENT DOCUMENTS

| | | | |
|---|---|---|---|
| 4,132,698 | A | 1/1979 | Gessler et al. |
| 4,536,537 | A | 8/1985 | Klingensmith et al. |
| 4,774,277 | A | 9/1988 | Janac et al. |
| 5,439,628 | A | 8/1995 | Huang |
| 5,820,970 | A | 10/1998 | Huang |
| 6,103,803 | A | 8/2000 | Cheung et al. |
| 6,520,235 | B1 | 2/2003 | Pasti |
| 7,235,623 | B2 | 6/2007 | Strand et al. |
| 2002/0086134 | A1 | 7/2002 | Welygan et al. |
| 2004/0034148 | A1 | 2/2004 | Kelly et al. |
| 2004/0260001 | A1 | 12/2004 | Lin et al. |
| 2007/0125898 | A1 | 6/2007 | Mussig et al. |
| 2008/0045638 | A1 | 2/2008 | Chapman et al. |

FOREIGN PATENT DOCUMENTS

| | | |
|---|---|---|
| JP | 09-208761 | 8/1997 |
| WO | WO 98/44041 | 10/1998 |
| WO | WO 99/41060 | 8/1999 |
| WO | WO 00/22031 | 4/2000 |
| WO | WO 00/78860 | 12/2000 |
| WO | WO 01/18109 | 3/2001 |
| WO | WO 03/048252 | 6/2003 |
| WO | WO 2004/014997 | 2/2004 |
| WO | WO 2004/014998 | 2/2004 |

OTHER PUBLICATIONS

White et al., *Rheological Analysis of Raw Elastomers with the Multispeed Mooney Shearing Disk Viscometer*, Journal of Applied Polymer Science, 1965, vol. 9, No. 5, pp. 1929-1946.
Tokita et al., *Milling Behavior of Gum Elastomers: Experiment and Theory*, Journal of Applied Polymer Science, vol. 10, No. 7, pp. 1011-1026.
Van Krevelen, *Some Basic Aspects of Flame Resistance of Polymeric Materials*, Polymer, 1975, vol. 16, No. 8, pp. 615-620.
Kresge, *Rubbery Thermoplastic Blends*, Polymer Blends, 1978, vol. 2, Chapter 20, pp. 293-318.
Galiatsatos et al., *Refractive Index, Stress-Optical Coefficient, and Optical Configuration Parameter of Polymers*, Physical Properties of Polymers Handbook, 1966, Chapter 39, pp. 535-543.
Schwarz, *Fire Retardation of Polyethylene and Polypropylene*, Flame Retardancy of Polymeric Materials, vol. 2, 1973, Chapter 2, pp. 83-133.
Chemical Additives for the Plastics Industry, Properties, Applications, Toxicologies, Radian Corporation, 1987, Chapter 14. Plasticizers, pp. 107-114.
Lohse et al., *"Thermodynamics of Polyolefin Blends"*, Polymer Blends, vol. 1: Formulation, 2000, Chapter 8, pp. 219-237.
Green, *"Flame Retardants and Smoke Suppressants"*, Polymer Modifiers and Additives, 2001, Chapter 6, pp. 173-271.
Choi et al., *"Synthesis of Phosphorus-Containing Two—Component Polyurethane Coatings and Evaluation of Their Flame Retardancy"*, Fire and Polymers—Materials and Solutions for Hazard Prevention, Chapter 9, ACS Symposium Series 797, American Chemical Society, Washington, DC, 2001, pp. 110-122.
Tokita, *"Analysis of Band Formation in Mill Operation"*, Paper presented at Second Annual National Conference of the Inst. Rubber Ind., Blackpool, United Kingdom, 1974, pp. 31-36.
Dealy et al., *"Effects of Molecular Structure"*, Melt Rheology and Its Role in Plastics Processing: Theory and Applications, Chapter 10, 1990, pp. 365-389.
Graessley, *"Viscoelasticity and Flow in Polymer Melts and Concentrated Solutions"*, Physical Properties of Polymers, 2nd Edition, American Chemical Society, Washington, DC, 1993, Chapter 3, pp. 97-143.
*"Plasticizers"*, Chemical Additives for the Plastics Industry: Properties, Applications, Toxicologies, Radian Corporation, 1987, Chapter 14, pp. 107-116.

*Primary Examiner* — Hui Chin
(74) *Attorney, Agent, or Firm* — Catherine L. Bell; Nancy T. Krawczyk; Leandro Arechederra, III

(57) ABSTRACT

This invention relates to a film or sheet and a process to make a film or sheet having a thickness of 0.5 to 35 mils comprising a blend composition comprising: a) 4 to 50 wt % of one or more polypropylene-based TPO(s); and b) 30 to 80 wt % of one or more ethylene plastomer(s); and c) 0.5 to 35 wt % of one or more non-functionalized plasticizer(s) having a kinematic viscosity at 100° C. of 4 to 300 cSt, a pour point of −20° C. or less, and a flash point of 200° C. or more; and d) 0 to 69.5 wt % of one or more filler(s); and wherein the blend composition is calendered into a film or sheet.

25 Claims, No Drawings

CALENDERED FILMS OF PLASTICIZED BLENDS OF PLASTOMER AND IMPACT COPOLYMER

US PRIORITY CLAIM

This application is a CIP of U.S. Ser. No. 11/504,447, filed Aug. 15, 2006, which is a continuation in part of U.S. Ser. No. 10/782,228, filed Feb. 19, 2004 (now granted as U.S. Pat. No. 7,531,594), which is a continuation in part of Ser. No. 10/640,435, filed Aug. 12, 2003 (now granted as U.S. Pat. No. 7,619,026), which claims priority to and the benefit of U.S. Ser. No. 60/402,665, filed Aug. 12, 2002. U.S. Ser. No. 10/782,228 is also a continuation in part of 10/634,351, filed Aug. 4, 2003 (now granted as U.S. Pat. No. 7,632,887), which claims priority to and the benefit of U.S. Ser. No. 60/402,665, filed Aug. 12, 2002.

STATEMENT OF RELATED CASES

This application relates to U.S. Ser. No. 11/406,926, filed Apr. 19, 2006; U.S. Ser. No. 12/392,218, filed Feb. 25, 2009; U.S. Ser. No. 11/118,925 filed Apr. 29, 2005, now granted as (U.S. Pat. No. 7,662,885); and U.S. Ser. No. 11/408,084, filed Apr. 19, 2006 (now allowed).

FIELD OF THE INVENTION

This invention relates to blends of non-functionalized plasticizer, plastomer and impact copolymer, and films therefrom.

BACKGROUND OF THE INVENTION

Interior upholstery and panel (both side and instrument) of an automobile are usually synthetic leather formulated from PVC (polyvinyl chloride) compounds blended with various amounts/types of plasticizer. For many reasons, car manufacturers prefer to use minimal amounts of PVC inside their cars. Because of chemical inertness, low density, and low cost, polyolefin (PO) compositions are the natural choice to replace PVC materials. Of course, in terms of soft touch feel and other mechanical properties, one has to balance the softness, flexibility, heat resistance, and flame retardance of these PO compositions. More importantly, the current manufacturers of car upholstery and panels want this type of PO based synthetic leather to be processable in their existing equipment (roll mills and calenders) for producing flexible PVC (fPVC) films. However, most POs, when put on a two-roll mill, tend to form films banded to the back roll (the faster-moving roll) when these films are thinner than about 30 mils (762 microns). This improper banding will prevent thin PO films from conveying continuously from one two-roll mill (or calender) to the others in the forward direction, disrupting the normal manufacturing process.

However, some applications require polymeric materials with a soft touch feel. Addition of mineral oil generally improves the flexibility, workability, or distensibility of POs. They are also added to POs as extender or processing oils. However, oils often do not preserve the optical properties (e.g., color and/or transparency), low odor, or use temperature ranges of POs. In addition, oils typically have high pour points (e.g., above −20° C.), producing little or no improvement in low-temperature properties. If their flash points are sufficiently low (e.g., less than 200° C.), the compound can cause smoking and be lost to the atmosphere during melt processing. Another serious drawback is that all or some of the oil can migrate to the polymer surface and evaporate, resulting in deterioration of properties over time. In this respect, they tend to leach out of the PO and impair food, clothing, and other articles that are in contact with the final article made from the PO composition. They can also cause problems with tackiness or other surface properties of the final article.

Conventional mineral oils, even paraffinic mineral oils, impair the properties of polyolefins, in particular semi-crystalline polyolefins (see WO 01/18109 A1 and *Chemical Additives for the Plastics Industry*, Radian Corp., 1987, pp. 107-116). Indeed, such compounds are often detrimental to semicrystalline polypropylene, in that they migrate to the surface causing parts to become oily (except at very low concentrations), or they degrade mechanical properties because they fail to depress the glass transition temperature effectively. WO 04/014998 discloses blends of polyolefins with non-functionalized plasticizers that are not mineral oils. In particular, Tables 8, 11, and 21a to 22f describe blends of certain impact copolymers with certain liquids and/or plasticizers, and Tables 23a to 23f describe blends of a certain thermoplastic polyolefin composition with certain liquids and/or plasticizers. These blends however are unsuitable for processing on a roll mill or calender because they do not have the appropriate balance of softness and melting properties.

Plasticized polyolefin compositions and their applications are also described in WO 04/014997 and US 2004/260001. Additional references of interest include: U.S. Pat. No. 4,132,698; U.S. Pat. No. 4,536,537; U.S. Pat. No. 4,774,277; US 2004/034148; WO 98/44041; WO 03/48252; and JP 09-208761.

In particular, US 2008/0045638 discloses hetero-phase polyolefin compositions comprising: a) 30 to 99.7 wt % of a polypropylene-based TPO comprising at least 50 wt % propylene and at least 10 wt % ethylene, b) 0.1 to 20 wt % of one or more non-functionalized plasticizer(s) (NFP), and c) 0.2 to 50 wt % of one or more filler(s); and having, among other things, a flexural modulus of 500 MPa or more.

Further, others have proposed processing of polypropylene based materials on calendering equipment. For example, U.S. Pat. No. 5,439,628 and U.S. Pat. No. 5,820,970 disclose certain films of polypropylene/polyethylene (LLDPE, HDPE, etc) blends prepared using calendering equipment. Likewise, U.S. Pat. No. 6,520,235 discloses PVC calendering where a polypropylene film is applied to the PVC during calendering as a casting sheet.

Thus, there is a need in the art for polyolefin compositions that can run on PVC milling and/or calendering equipment without banding to the faster roll and/or disrupting conveyance to a calender mill. There is also a need in the art for such polyolefin compositions capable of being run on PVC milling and/or calendering equipment that have good optical properties, good scratch resistance, good permanence, and/or low tackiness.

The instant invention meets such needs by providing ternary blends of plastomer, an impact copolymer (ICP), and a plasticizer that exhibit good processability on mills and calenders for producing films with thickness of 30 mils (762 microns) or less.

SUMMARY OF THE INVENTION

This invention relates to a film or sheet having a thickness of from 0.5 to 35 mils (12.7 to 889 microns) comprising a blend composition comprising:
a) 4 to 50 wt %, based upon the weight of the composition, of one or more polypropylene-based TPO(s) comprising at least 50 wt % propylene and at least 10 wt % ethylene having a melt flow rate (MFR) of 7 dg/min or less (ASTM 1238, 2.16 Kg, 230° C.), a melting point, Tm, of 150° C. or more, and a lowest Tg of −30° C. or less (determined by DMTA as described below); and b) 30 to 80 wt %, based upon the weight of the composition, of one or more ethylene plastomer(s) having a melt index of 3 dg/min or less (ASTM D 1238 (190° C./2.16 kg) and a density of 0.869 to 0.910 g/cc (ASTM D 1505); and c) 0.5 to 35 wt %, based upon the weight of the composition, of one or more non-functionalized plasticizer(s) having a kinematic viscosity at 100° C. of 4 to 300 cSt, a pour point of −20° C. or less, and a flash point of 200° C. or more; and d) 0 to 69.5 wt %, based upon the weight of the composition, of one or more filler(s); and said blend composition having:

i) tensile strength of 7 MPa or more (ASTM D 638, Type I bar, 5 cm/min, TD), and ii) an elongation at break of 400% or more (ASTM D 638, Type I bar, 5 cm/min, MD and TD); and iii) a flexural modulus of 50 MPa or less, preferably 30 MPa or less (ASTM D790, A, 1.3 mm/min); and iv) Vicat softening point of 50° C. or more (ASTM D 648 (200 g)); and v) highest Tm is 145° C. or more; and vi) a Roll Change Point of 5 to less than 29 mils (127 to 737 microns); and wherein the blend composition is calendered into a film or sheet having a thickness of 0.5 to 35 mils (12.7 to 889 microns).

DEFINITIONS

The following definitions are made for purposes of this invention and the claims thereto.

The term "Roll Change Point" is defined to be the point in decreasing nip distance at which a blend, being processed on a lab scale two roll mill as described below, changes from a front roll band formation to a back roll band formation.

The Tg is determined by the loss tangent peak position using a DMTA V instrument in tension mode; 0.05% strain, 1 Hz frequency, 2° C./min heating rate, and about 1-mm thick specimen. The term "lowest Tg" means the lowest Tg temperature in degrees Celsius if there is more than one Tg indicated on the DMTA loss tangent trace.

The melting point, Tm, is determined by Differential Scanning calorimetry (DSC) as described at page 36-37, paragraphs [0597]-[0599] of US 2008/0045638, specifically according to ASTM D 3418 using a TA Instruments Model 2920 DSC. The term "highest Tm" means the highest Tm temperature in degrees Celsius if there is more than one Tm indicated on the DSC trace.

A film has a thickness of 30 mils (762 microns) or less and a sheet has a thickness of greater than 30 mils (762 microns).

When a polymer or oligomer is referred to as comprising an olefin, the olefin present in the polymer or oligomer is the polymerized or oligomerized form of the olefin, respectively. The term polymer is meant to encompass homopolymers and copolymers. The term copolymer includes any polymer having two or more different monomers in the same chain, and encompasses random copolymers, statistical copolymers, interpolymers, and block copolymers.

When a polymer blend is said to comprise a certain percentage of a monomer, that percentage of monomer is based on the total amount of monomer units in all the polymer components of the blend. For example if a blend comprises 50 wt % of polymer A, which has 20 wt % monomer X, and 50 wt % of a polymer B, which has 10 wt % monomer X, the blend comprises 15 wt % of monomer X.

For purposes of this invention and the claims thereto a "polymer" has a number-average molecular weight ($M_n$) of 20,000 g/mol or more, while an "oligomer" has a $M_n$ of less than 20,000 g/mol. Preferably, a polymer has a $M_n$ of 40,000 g/mol or more (preferably 60,000 g/mol or more, preferably 80,000 g/mol or more, preferably 100,000 g/mol or more). Preferably, an oligomer has a $M_n$ of less than 15,000 g/mol (preferably less than 13,000 g/mol, preferably less than 10,000 g/mol, preferably less than 5,000 g/mol, preferably less than 4,000 g/mol, preferably less than 3,000 g/mol, preferably less than 2,000 g/mol, preferably less than 1,000 g/mol).

A "polyolefin" is a polymer comprising at least 50 mol % of one or more olefin monomers. Preferably, a polyolefin comprises at least 60 mol % (preferably at least 70 mol %, preferably at least 80 mol %, preferably at least 90 mol %, preferably at least 95 mol %, preferably 100 mol %) of one or more olefin monomers, preferably 1-olefins, having carbon numbers of 2 to 20 (preferably 2 to 16, preferably 2 to 10, preferably 2 to 8, preferably 2 to 6). Preferably, a polyolefin has an Mn of 2,000 g/mol or more, preferably 4,000 g/mol or more (preferably 6,000 g/mol or more, preferably 80,000 g/mol or more, preferably 100,000 g/mol or more). In some embodiments, the polyolefins used herein are not functionalized. Not functionalized means having functional groups selected from hydroxide, aryls, substituted aryls, halogens, alkoxys, carboxylates, esters, carbon unsaturation, acrylates, oxygen, nitrogen, and carboxyl present at less than 0.01 wt %, preferably less than 0.001 wt %, preferably at 0 wt %), based upon the weight of the polyolefin as determined by sum frequency generation (SGF) spectroscopy at the polymer/sapphire or polymer/quartz interface. Normally functional groups (no matter how low in concentrations) migrate to this interface and increase surface concentrations. SFG is capable of detecting 0.01 of a monolayer. References: K. S. Gautam, A. D. Schwab, A. Dhinojwala, D. Zhang, S. M. Dougal, and M. S. Yeganeh, *Phys. Rev. Lett.,* 85, 3854 (2000); M. F. Tse, W. Hu, M. S. Yeganeh, and D. Zhang, *J. Appl. Polym. Sci.,* 93, 323 (2004).

An "isotactic" polyolefin has at least 10% isotactic pentads, a "highly isotactic" polyolefin has at least 50% isotactic pentads, and a "syndiotactic" polyolefin has at least 10% syndiotactic pentads, according to analysis by $^{13}$C-NMR. Preferably isotactic polymers have at least 20% (preferably at least 30%, preferably at least 40%) isotactic pentads. A polyolefin is "atactic" if it has less than 5% isotactic pentads and less than 5% syndiotactic pentads.

The terms "polypropylene" and "propylene polymer" mean a polyolefin comprising at least 50 mol % propylene units and having less than 35 mol % ethylene units. Preferably the "polypropylene" and "propylene polymer" comprise at least 60 mol % (preferably at least 70 mol %, preferably at least 80 mol %, preferably at least 90 mol %, preferably at least 95 mol %, preferably 100 mol %) propylene units; and have less than 35 mol % ethylene units. While propylene-rich ethylene/propylene copolymers are generically a class of propylene copolymer, a special distinction is made herein for the composition range commonly associated with EP Rubber, as defined below. The comonomers in a propylene copolymer are preferably chosen from among ethylene and $C_4$ to $C_{20}$ olefins (preferably ethylene and $C_4$ to $C_8$ 1-olefins). The term "polypropylene" is meant to encompass isotactic polypropylene (iPP), highly isotactic polypropylene, syndiotactic polypropylene (sPP), homopolymer polypropylene (hPP, also called propylene homopolymer or homopolypropylene), and so-called random copolymer polypropylene (RCP, also called propylene random copolymer). Herein, an RCP is specifically defined to be a copolymer of propylene and 1 to 10 wt % of an olefin chosen from ethylene and $C_4$ to $C_8$ 1-olefins. Preferably, the olefin comonomer in an RCP is ethylene or 1-butene, preferably ethylene.

The terms "polyethylene" and "ethylene polymer" mean a polyolefin comprising at least 50 mol % ethylene units and having less than 15 mol % propylene units. Preferably the "polyethylene" and "ethylene polymer" comprise at least 60 mol % (preferably at least 70 mol %, preferably at least 80 mol %, even preferably at least 90 mol %, even preferably at least 95 mol % or preferably 100 mol %) ethylene units; and have less than 15 mol % propylene units. While ethylene-rich ethylene/propylene copolymers are generically a class of ethylene copolymer, a special distinction is made herein for the composition range commonly associated with EP Rubber, as defined below. The comonomers in an ethylene copolymer are preferably chosen from $C_3$ to $C_{20}$ olefins (preferably $C_3$ to $C_8$ 1-olefins). An "ethylene elastomer" is an ethylene copolymer having a density of less than 0.86 g/cm³. An "ethylene plastomer" (or simply a "plastomer") is an ethylene copolymer having a density of 0.86 to 0.91 g/cm³. A "low density polyethylene" is an ethylene polymer having a density of more than 0.91 g/cm³ to less than 0.94 g/cm³; this class of polyethylene includes copolymers made using a heterogeneous catalysis process (often identified as linear low density polyethylene, LLDPE) and homopolymers or copolymers made using a high-pressure/free radical process (often identified as LDPE). A "high density polyethylene" ("HDPE") is an ethylene polymer having a density of 0.94 g/cm³ or more.

The term "EP Rubber" means a copolymer of ethylene and propylene, and optionally one or more diene monomer(s), where the ethylene content is from 35 to 85 mol %, the total diene content is 0 to 5 mol %, and the balance is propylene with a minimum propylene content of 15 mol %.

The term "hetero-phase" refers to the presence of two or more morphological phases in a blend of two or more polymers, where each phase comprises a different ratio of the polymers as a result of partial or complete immiscibility (i.e., thermodynamic incompatibility). A common example is a morphology consisting of a "matrix" (continuous) phase and at least one "dispersed" (discontinuous) phase. The dispersed phase takes the form of discrete domains (particles) distributed within the matrix (or within other phase domains, if there are more than two phases). Another example is a co-continuous morphology, where two phases are observed but it is unclear which is the continuous phase and which is the discontinuous phase. The presence of multiple phases is determined using microscopy techniques, e.g., optical microscopy, scanning electron microscopy (SEM), or atomic force microscopy (AFM); or by the presence of two glass transition peaks in a dynamic mechanical analysis (DMA) experiment; in the event of disagreement among these methods, the AFM determination shall be used.

A "thermoplastic polyolefin" (TPO) is a specific type of hetero-phase polyolefin composition. These are blends of a high-crystallinity "base polyolefin" (having a melting point of 100° C. or more) and a low-crystallinity or amorphous "polyolefin modifier" (having a Tg of −20° C. or less). The hetero-phase morphology consists of a matrix phase comprised primarily of the base polyolefin, and a dispersed phase (which is not, or is only modestly, cross-linked) comprised primarily of the polyolefin modifier. Thus, the matrix phase has a modulus that is higher, often substantially higher, than that of the dispersed phase. TPO compositions may also comprise components such as fillers, additives, and other useful compounding ingredients.

The term "primarily" is defined to mean primarily at least 50 wt %. Preferably primarily means at least 90 wt %.

A "polypropylene-based thermoplastic polyolefin" (or equivalently, a "polypropylene-based TPO") is a specific type of TPO, in that the matrix phase comprises primarily a high-crystallinity polypropylene having a melting point ($T_m$) of 100° C. or more, and the dispersed phase comprises primarily a polyolefin having a glass transition temperature ($T_g$) of −20° C. or less. Preferably, the matrix phase comprises primarily homopolymer polypropylene (hPP) and/or random copolymer polypropylene (RCP) with relatively low comonomer content (less than 5 wt %), and has a melting point of 110° C. or more (preferably 120° C. or more, preferably 130° C. or more, preferably 140° C. or more, preferably 150° C. or more, preferably 160° C. or more). Preferably, the dispersed phase comprises primarily one or more ethylene copolymer(s) with relatively high comonomer content (at least 5 wt %, preferably at least 10 wt %) and has a $T_g$ of −30° C. or less (preferably −40° C. or less, preferably −50° C. or less).

A "polypropylene impact copolymer" (herein simply referred to as an "impact copolymer" or an "ICP") is a specific type of polypropylene-based TPO, comprising 40 to 95 wt % of (A) hPP or RCP with a $T_m$ of 150° C. or more, and 5 to 60 wt % of (B) propylene copolymer (or an EP Rubber) with a lowest $T_g$ of −30° C. or less. The morphology of an ICP is such that the matrix phase is comprised primarily of component (A) while the dispersed phase is comprised primarily of component (B). Preferably, the ICP comprises only two monomers: propylene and a single comonomer chosen from among ethylene and $C_4$ to $C_8$ 1-olefins (preferably ethylene or 1-butene, preferably ethylene). Preferably, the (A) component has a $T_m$ of 120° C. or more (preferably 130° C. or more, preferably 140° C. or more, preferably 150° C. or more, preferably 160° C. or more). Preferably, the (B) component is EP Rubber. Preferably, the (B) component has a $T_g$ of −30° C. or less (preferably −40° C. or less, preferably −50° C. or less).

An "in-situ ICP" is a specific type of ICP which is a reactor blend of the (A) and (B) components of an ICP, meaning (A) and (B) were made in separate reactors (or reactions zones) physically connected in series or in parallel, with the effect that an intimately mixed final product is obtained in the product exiting the final reactor (or reaction zone). Typically, the components are produced in a sequential polymerization process, wherein (A) is produced in a first reactor is transferred to a second reactor where (B) is produced and incorporated as domains into the (A) matrix or two sequential polymerization reactions occur in the same reactor. There may also be a minor amount of a third component (C), produced as a byproduct during this process, comprising primarily the non-propylene comonomer (e.g., (C) will be an ethylene polymer if ethylene is used as the comonomer). In the literature, especially in the patent literature, an in-situ ICP is sometimes identified as "reactor-blend ICP" or a "block copolymer" although the latter term is misleading since there is at best only a very small fraction of molecules that are (A)-(B) copolymers.

An "ex-situ ICP" is a specific type of ICP which is a physical blend of (A) and (B), meaning (A) and (B) were synthesized independently and then subsequently blended typically using a melt-mixing process, such as an extruder. An ex-situ ICP is distinguished by the fact that (A) and (B) are collected in solid form after exiting their respective synthesis processes, and then combined; whereas for an in-situ ICP, (A) and (B) are combined within a common synthesis process and only the blend is collected in solid form.

For purposes of this invention, TPO compositions do not include those hetero-phase polyolefins generally referred to as "Thermoplastic Vulcanizates" (TPVs). These are blends of a high-crystallinity polypropylene and a low-crystallinity or amorphous polyolefin modifier (often an ethylene-propylene elastomer) which is highly cross-linked (vulcanized) through the use of a cross-linking agent to provide a rubber-like resilience to the composition, and optionally other compounding ingredients; see, for example, U.S. Pat. No. 4,311,628. The polyolefin modifier in hetero-phase polyolefin compositions of the instant invention are not crosslinked to an appreciable extent. That is, the so-called "gel content" of the composition is low, so that preferably less than 50 wt %, preferably less than 40 wt %, preferably less than 30 wt %, preferably less than 20 wt %, preferably less than 10 wt %, preferably less than 5 wt %, preferably 0%) of the polyolefin modifier is insoluble in boiling xylene.

A "liquid" is defined to be a material that flows at room temperature, having a pour point of less than +20° C. and a kinematic viscosity at 25° C. of 30,000 cSt or less. The NFP's useful in this invention are liquids.

The term "paraffin" refers to saturated hydrocarbons, including normal paraffins, branched paraffins, isoparaffins, cycloparaffins, and blends thereof, and may be derived synthetically or from refined crude oil by means known in the art. More specifically, the following terms have the indicated meanings "isoparaffins" are branched chain-type saturated hydrocarbons (i.e., branched alkanes, having at least one tertiary or quaternary carbon atom), which possess at least one $C_1$ to $C_{18}$ (more commonly $C_1$ to $C_{10}$) alkyl branch along at least a portion of each chain; "normal paraffins" are unbranched chain-type saturated hydrocarbons (i.e., normal alkanes); and "cycloparaffins" (also known as "naphthenes") are cyclic (mono-ring and/or multi-ring) saturated hydrocarbons and branched cyclic saturated hydrocarbons. For each class of paraffin, various structural isomers will typically be present for each carbon number. Unsaturated hydrocarbons include alkenes (olefins, diolefins, etc.), alkynes, and "aromatics" (unsaturated mono-ring and/or multi-ring cyclic moieties, including branched cyclic unsaturated hydrocarbons).

The term "mineral oil" includes any hydrocarbon liquid of lubricating viscosity (i.e., a kinematic viscosity at 100° C. of 1 cSt or more) derived from petroleum crude oil and subjected to one or more refining and/or hydroprocessing steps (such as fractionation, hydrocracking, dewaxing, isomerization, and hydrofinishing) to purify and chemically modify the components to achieve a final set of properties. Such "refined" oils are in contrast to "synthetic" oils, which are manufactured by combining monomer units using catalysts and/or heat. In the lubricant industry, refined "basestocks" (which are mineral oils) are commonly divided into three categories based on their properties, as follows:

| Category | Saturates | Sulfur | | Viscosity Index |
|---|---|---|---|---|
| Group I | <90 wt % and/or | >0.03 wt % | And | 80-119 |
| Group II | ≧90 wt % and | ≦0.03 wt % | And | 80-119 |
| Group III | ≧90 wt % and | ≦0.03 wt % | And | ≧120 |

However, even if a mineral oil is not specifically identified by one of these basestocks classification, it is still possible to categorize it using this scheme. Accordingly, herein, a "Group III Mineral Oil" is defined to be a mineral oil having a viscosity index of 120 or more, whereas a "Group III basestock" is defined according to the above table; therefore, any Group III basestock will also be a Group III Mineral Oil, but the opposite is not necessarily true.

In the polymer industry, mineral oils are often called "process oils" (or "extender oils"). A common classification system for process oils is to identify them as either "paraffinic", "naphthenic", or "aromatic" mineral (or process or extender) oils based on the relative content of paraffinic, naphthenic, and aromatic moieties (see Typical in the table below). Herein, the three common classes are defined based on the compositions described under Definitions in the table below:

| Mineral Oil | Typical | | | Definitions | | |
|---|---|---|---|---|---|---|
| Type | $C_P$ | $C_N$ | $C_A$ | $C_P$ | $C_N$ | $C_A$ |
| Paraffinic | 60-80% | 20-40% | 0-10% | ≧60% | <40% | <20% |
| Naphthenic | 40-55% | 40-55% | 6-15% | | ≧40% | <20% |
| Aromatic | 35-55% | 10-35% | 30-40% | | | ≧20% | where $C_P$, $C_N$, and $C_A$ indicate the percentage of carbons in paraffinic chain-like (i.e., isoparaffinic and normal paraffinic) structures, naphthenic (i.e., saturated ring) structures, and aromatic (i.e., unsaturated ring) structures, respectively.

The term "substantially absent" means that the compounds in question are not added deliberately to the compositions and, if present, are present at less than 1 wt %, based upon the total weight of the composition. Preferably, the compounds in question are present at less than 0.5 wt % (preferably less than 0.1 wt %, preferably less than 0.05 wt %, preferably less than 0.01 wt %, preferably less than 0.001 wt %, preferably at 0 wt %), based upon the total weight of the composition.

For purpose of this invention and the claims thereto, unless otherwise noted, physical and chemical properties described herein are measured using the test methods described under the Experimental Methods section.

DETAILED DESCRIPTION OF THE INVENTION

This invention relates to films or sheets having a thickness of from 0.5 to 30 mils (12.7 to 762 microns), preferably 2 to 30 mils (50.8 to 762 microns) comprising plasticized blend compositions comprising one or more polypropylene-based TPOs, one or more ethylene plastomers, and one or more non-functionalized plasticizers that can be milled and or calendered to form films or sheets of about 0.5 to about 30 mils (12.7 to 762 microns), preferably 2 to 30 mils (50.8 to 762 microns) in thickness.

Specifically, the rheological or processability behavior on the mill and calender and mechanical properties (tensile, softness, flexural modulus, heat resistance, etc.) can be affected by the blend composition/morphology, the melt index and density of the plastomer, the melt flow rate and/or rubber content of the ICP, the kinematic viscosity (at 100° C.) of the plasticizer, and the presence or absence of a filler. To improve flame retardance, various non-halogenated flame retardants may also be formulated into the blends, while preserving blend processability and mechanical behaviors. In a preferred embodiment, the flammability (as determined by Federal Motor Vehicle Standard Safety 302) of the blend compositions described is 60 mm/min or less, preferably 55 mm/min or less, preferably 40 mm/min or less.

More specifically, this invention relates to a blend composition comprising:
a) 4 to 50 wt % (preferably 5 to 40 wt %, preferably 6 to 20 wt %), based upon the weight of the composition, of a polypropylene-based TPO (preferably an ICP) comprising at least 50 wt % propylene and at least 10 wt % ethylene, having an MFR of 10 dg/min or less (preferably 5 dg/min or less, preferably 1.5 dg/min or less, preferably 1 dg/min or less); and b) 30 to 80 wt % (preferably 40 to 70 wt %), based upon the weight of the composition, of an ethylene plastomer having a melt index of 3 dg/min or less (preferably 2 dg/min or less, preferably 1 dg/min or less, preferably 0.5 dg/min or less) and a density of 0.860 to 0.91 g/cc (preferably 0.862 to 0.890 g/cc, preferably 0.862 to 0.87 g/cc); and c) 0.25 to 35 wt % (preferably 1 to 30 wt %, preferably 2 to 20 wt % preferably 5 to 15 wt %), based upon the weight of the composition, of one or more non-functionalized plasticizer(s) having a kinematic viscosity at 100° C. of 4 to 300 cSt (preferably 5 to 100 cSt, preferably 8 to 20 cSt), a pour point of −20° C. or less (preferably −25° C. or less, preferably −30° C. or less, preferably −40° C. or less), a flash point of 200° C. or more (preferably 220° C. or more, preferably 240° C. or more, preferably 260° C. or more), (preferably the NFP also has a viscosity index of 100 or more (preferably 110 or more, preferably 120 or more, preferably 130 or more), and or a specific gravity of 0.88 or less (preferably 0.87 or less, preferably 0.86 or less); and d) 0 to 69.5 wt % (preferably 0.2 to 50 wt %, preferably 0.5 to 40 wt %, preferably 1 to 30 wt %, preferably 5 to 20 wt %), based upon the weight of the composition, of one or more filler(s), preferably flame retardant filler; and based upon the weight of the composition, and said blend composition having:

i) a tensile strength (Machine Direction) of 7 MPa or more (preferably 8 MPa or more, preferably 9 MPa or more, preferably 10 MPa or more); and ii) an elongation at break (Transverse and/or Machine Direction) of 400% or more (preferably 500% or more, preferably 700% or more, preferably 900% or more); and iii) a flexural modulus of 50 MPa or less (preferably 30 MPa or less, preferably from 3 to 40 MPa, preferably from 5 to 30 MPa); and iv) a Vicat softening temperature of 50° C. or more, preferably 55° C. or more, preferably 58° C. or more; and v) a highest Tm of 145° C. or more, preferably 150° C. or more, preferably 155° C. or more; and vi) a Roll Change Point of 5 to 29 mils (127 to 737 microns), preferably of 10 to 25 mils (254 to 635 microns), preferably 15 to 22 mils (381 to 559 microns); and wherein the blend composition is calendered into a film or sheet having a thickness of 0.5 to 35 mils (12.7 to 889 microns), preferably 2 to 30 mils (51 to 762 microns), preferably 10 to 30 mils (254 to 762 microns), preferably 20 to 30 mils (508 to 762 microns), preferably 20 to 25 mils (508 to 635 microns).

Roll Change Point is determined on a 1 horse power lab scale two roll mill (specifically a lab scale two roll mill from Kobelco Stewart Bolling Inc. (Hudson, Ohio 44236)) having bored and chrome plated rolls having a size of 3"×3"×7". The front roll speed is set at 27.9 rpm, the back roll speed is set at 39 rpm, with a friction ratio of 1.4. The roll temperature is held at 150° C. Thereafter, the blend composition is fed to the mill at a nip distance of 100 mil (2540 microns) and the operator helps the blend composition band to the front roll. The nip distance is then gradually reduced from 100 mil to 10 mil (2540 to 254 microns) at a rate of 1 mil per minute (25.4 microns per minute). The roll change point is defined as the nip distance at which the blend composition begins to band to the back roll instead of the front roll.

In a preferred embodiment, any blend composition of the present invention has a melt flow rate (MFR) at 230° C. using a lower load of 2.16 kg of 0.1 to 20 dg/min (preferably 1.0 to 10 dg/min, preferably 1.2 to 8.0 dg/min), and a melt flow rate (MFR) at 230° C. using a higher load of 21.6 kg of 30 to 800 dg/min (preferably 45 to 700 dg/min, preferably 60 to 600 dg/min).

In a preferred embodiment, any blend composition of the present invention has:

i) a tensile strength (Machine Direction) of 7 MPa or more (preferably 8 MPa or more, preferably 9 MPa or more, preferably 10 MPa or more); and ii) an elongation at break (Transverse and Machine Direction) of 400% or more (preferably 500% or more, preferably 700% or more, preferably 900% or more); and iii) a flexural modulus of 50 MPa or less (preferably 30 MPa or less, preferably from 3 to 40 MPa, preferably from 5 to 30 MPa); and iv) a Vicat softening temperature of 50° C. or more, preferably 55° C. or more, preferably 58° C. or more; and v) a highest Tm of 145° C. or more, preferably 150° C. or more, preferably 155° C. or more; and vi) a Roll Change Point of 5 to 29 mils (127 to 737 microns), preferably of 10 to 25 mils (254 to 635 microns), preferably 15 to 22 mils (381 to 559 microns); and one or more of the following properties:

a) Two melting points as measured by DSC (the first being at least 145° C. and the second being at least 40° C., where the two Tm's are at least 20° C. apart; and/or b) a Tear Strength of 45 kg/cm or more, preferably 50 kg/cm or more, preferably 55 kg/cm or more.

Preferred blend compositions of the present invention can be characterized in that the glass transition temperature ($T_g$) of at least one polymer component in the composition is depressed by at least 2° C. (preferably at least 4° C., preferably at least 6° C., preferably at least 8° C., preferably at least 8° C., preferably at least 10° C.) for every 1 wt % of NFP present in the composition, while the peak melting temperature of the highest melting component remains within 5° C. (preferably within 4° C., preferably within 3° C., preferably within 2° C.) of its value for the same composition absent the NFP.

Preferred compositions of the present invention can be characterized in that the weight loss of the composition containing the NFP is less than 3% (preferably less than 2%, preferably less than 1%) when permanence of the NFP is determined as described in the Experimental Methods section. Weight loss here refers to the reduction in weight in excess of that measured for the same composition without the NFP under the same test conditions.

In another embodiment, the blend composition exhibits an equal or better scratch resistance rating as compared the same blend composition without NFP (i.e., where the ratio of the remaining component weight fractions is the unchanged). Preferably, the compositions of this invention have a scratch resistance rating of 3 N or more (preferably 5 N or more, preferably 7 N or more, preferably 10 N or more, preferably 12 N or more). The scratch resistance rating is determined as described in the Experimental Methods section.

The films and sheets of the present invention have useful puncture or impact resistance, scratch resistance, weatherability (UV, ozone, . . . ), tear resistance, lay flat, grain retention, elastic modulus, tension set, elastic recovery, flame retardance, color retention, low gloss, softness, coefficients of friction, and the like.

Polypropylene-Based TPO

In a preferred embodiment, the polypropylene-based TPO comprises a matrix having a melting point ($T_m$) of 110° C. or more (preferably 120° C. or more, preferably 125° C. or more, preferably 130° C. or more, preferably 140° C. or more, preferably 150° C. or more, preferably 160° C. or more) and a dispersed phase having a glass transition temperature ($T_g$) of −20° C. or less (preferably −25° C. or less, preferably −30° C. or less, preferably −35° C. or less, preferably −40° C. or less, preferably −45° C. or less, preferably −50° C. or less, preferably −55° C. or less).

In any of the above embodiments the propylene based TPO is preferably one or more ICP(s), preferably at least one of the ICP(s) is an in-situ ICP; more preferably all the ICP(s) are in-situ ICP(s). Alternately, the combination of ICP(s) comprises two in-situ ICPs; alternately, the composition comprises only one in-situ ICP.

Preferred ICP's preferably comprises a polypropylene component (A) of hPP or RCP, and a rubber component (B) of propylene copolymer or EP Rubber. The morphology is such that the matrix phase is comprised primarily of (A) while the dispersed phase is comprised primarily of (B). Preferred ICPs useful in this invention include those having one or more of the following properties:

1) total propylene content of at least 75 wt % (preferably at least 80 wt %, preferably at least 85 wt %, preferably at least 90 wt %, preferably at least 95 wt %) based on the weight of the ICP; and/or 2) total comonomer content of 1 to 35 wt % (preferably 2 to 30 wt %, preferably 3 to 25 wt %, preferably 5 to 20 wt %) based on the weight of the ICP; and/or 3) rubber content of 5 to 40 wt % (preferably 6 to 35 wt %, preferably 7 to 30 wt %, preferably 8 to 30 wt %) based upon the weight of the ICP; and/or 4) propylene content of the rubber component of 25 to 80 wt % (preferably 30 to 75 wt %, preferably 35 to 70 wt %, preferably at least 40 wt %) based on the weight of the rubber component; and/or 5) ratio of the intrinsic viscosity (IV) of the rubber component to the IV of the polypropylene component of 0.5 to 15 (preferably 0.75 to 12, preferably 1 to 8) as determined by ASTM D 1601 (135° C. in decalin); and/or 6) propylene meso diads in the polypropylene component of 90% or more (preferably 92% or more, preferably 94% or more, preferably 96% or more); and/or 7) $M_w$ of 20,000 to 2,000,000 g/mol (preferably 50,000 to 1,000,000 g/mol, preferably 90,000 to 500,000 g/mol); and/or 8) melt flow rate (MFR) of 1 to 300 dg/min (preferably 5 to 150 dg/min, preferably 10 to 100 dg/min, preferably 15 to 80 dg/min, preferably 20 to 60 dg/min); and/or 9) melting point ($T_m$, second heat, peak) of 100° C. or more (preferably 110° C. or more, preferably 120° C. or more, preferably 130° C. or more, preferably 140° C. or more, preferably 150° C. or more, preferably 155° C. or more, preferably 160° C. or more); and/or 10) heat of fusion ($H_f$, second heat) of 60 J/g or more (preferably 70 J/g or more, preferably 80 J/g or more, preferably 90 J/g or more, preferably 95 J/g or more, preferably 100 J/g or more); and/or 11) glass transition temperature ($T_g$) of the rubber component of −30° C. or less (preferably −40° C. or less, preferably −50° C. or less); and/or 12) glass transition temperature ($T_g$) of the polypropylene component of −10° C. or more (preferably −5° C. or more, preferably 0° C. or more); and/or 13) flexural modulus of 300 to 3000 MPa (preferably 500 to 2500 MPa, preferably 700 to 2000 MPa, preferably 900 to 1500 MPa, preferably 1300 to 3000 MPa); and/or 14) notched Izod impact strength at 23° C. of 2.5 J/m or more (preferably 5 J/m or more, preferably 7.5 J/m or more, preferably 10 J/m or more, preferably 15 J/m or more, preferably 20 J/m or more, preferably 25 J/m or more, preferably 50 J/m or more) as determined by ASTM D256 Method A or Method B if reverse notch is noted; and/or 15) Gardner impact strength at −30° C. of 2 to 100 J (preferably 3 to 80 J, preferably 4 to 60 J) as determined by ASTM D 5420 GC as determined by ASTM D 648 (0.45 MPa); and/or 16) heat deflection temperature (HDT) of 80° C. or more (preferably 85° C. or more, preferably 90° C. or more, preferably 95° C. or more) as determined by ASTM D 648 (0.45 MPa).

Comonomers used in conjunction with propylene to make an ICP are typically chosen from ethylene and $C_4$ to $C_8$ 1-olefins, preferably from ethylene and 1-butene. In a preferred embodiment, the comonomer is ethylene and is present in the ICP at 1 to 50 wt % (preferably 2 to 40 wt %, preferably 3 to 30 wt %, preferably 5 to 20 wt %) based on the weight of the ICP. In another preferred embodiment, the rubber component of the ICP comprises 20 to 75 wt % (preferably 25 to 70 wt %, preferably 30 to 65 wt %, preferably less than 60 wt %) ethylene, and the balance propylene, based on the weight of the rubber component. More than one comonomer may also be employed, preferable selected from ethylene and $C_4$ to $C_8$ 1-olefins, such as ethylene and butene-1 or ethylene and hexene-1, such that the rubber component comprises a propylene terpolymer.

In-situ ICPs are particularly preferred. For in-situ ICPs, the polypropylene (A) and rubber (B) components may be made using any appropriate polymerization process, including gas-phase, solution, slurry, and high-pressure polymerization processes. Preferably, (A) is made in a solution or slurry process, and (B) is made in a gas-phase process. More preferably, the in-situ ICP is made using a slurry reactor to produce an hPP (A) component, and a gas-phase reactor to produce an EP Rubber (B) component. The in-situ ICP polymerization processes may employ any appropriate polymerization catalyst or combination of catalysts, including Ziegler-Natta and/or single-site (e.g., metallocene) polymerization catalysts, which may be supported (for use in heterogeneous catalysis processes) or not (for use in homogeneous catalysis processes). Preferably, (A) and (B) are made using a common supported Ziegler-Natta or single-site catalyst.

In another embodiment, the rubber component comprises a propylene copolymer with a weight-average molecular weight ($M_w$) of at least 50,000 g/mol (preferably 100,000 g/mol, preferably 150,000 g/mol, preferably 200,000 g/mol); a molecular weight distribution ($M_w/M_n$) of less than 3.5 (preferably less than 3.0, preferably 1.8 to 2.5); and a CDBI of greater than 60% (preferably greater than 65%, preferably greater than 70%, preferably greater than 75%, preferably greater than 80%, preferably greater than 85%). CDBI is a measure of the composition distribution of monomer within the polymer chains. It is measured as described in WO 93/03093, with the modification that any fractions having a weight-average molecular weight ($M_w$) below 20 kg/mol are ignored in the calculation.

In-situ ICPs useful in the present invention are commercially available from many manufacturers, including Exxon-Mobil Chemical, Borealis, Dow Chemical (including INSPIRE™ grades), Sunoco Chemical, and Total Petrochemicals.

Suitable examples include:

| ExxonMobil Chemical in-situ ICPs | | |
|---|---|---|
| Grade | MFR (dg/min) | Flexural Modulus (MPa) |
| PP7032 | 4-5 | 1100-1345 |
| PP7011L1 | 1 | 1150 |
| PP7031 | 1 | 1350 |

| Dow Chemical in-situ ICPs | | |
|---|---|---|
| Grade | MFR (dg/min) | Flexural Modulus (MPa) |
| 7C06 | 1.5 | 1280 |
| C104 | 1.2 | 1240 |
| C783 | 3.8 | 1340 |
| Inspire D114 | 0.5 | 1260 |

| Sunoco Chemical in-situ ICPs | | |
|---|---|---|
| Grade | MFR (dg/min) | Flexural Modulus (MPa) |
| TI4005 | 0.5 | 1340 |
| TI4015 | 1.6 | 1240 |
| TI4040 | 4 | 1410 |

Suitable ICPs are also commercially available from Basell Polyolefins, including "Advanced Polyolefins" grades made using their CATALLOY™ polymerization process, some of which are commercially available under the ADFLEX™ tradename. Basell also sells useful ICPs under the HIFAX™ and PROFAX™ tradenames. Examples include:

| Basell Polyolefins in-situ ICPs | | |
|---|---|---|
| Grade | MFR (dg/min) | Flexural Modulus (MPa) |
| Adflex C200 | 6 | 230 |
| Adflex Q300 | 0.6 | 330 |
| Hifax CA12 | 0.9 | 350 |
| Profax SA933 | 1.4 | 970 |
| Profax SB912 | 6 | 1450 |
| Profax SC204 | 3.8 | 1590 |
| Profax SV258 | 1.2 | 1240 |
| Profax 7823 | 0.45 | 1100 |
| Profax 8623 | 1.5 | 970 |
| Profax 8523 | 4 | 970 |

Useful in-situ-impact copolymers may be prepared by the process described in U.S. Pat. No. 4,379,759; U.S. Pat. No. 6,342,566; and U.S. Pat. No. 6,384,142. A general description of in-situ ICPs can be found in POLYPROPYLENE HANDBOOK, E. P. Moore, Ed. (Hanser-Verlag, 1996).

Ex-situ ICP's may also be used herein. Preferred EP Rubbers useful in ICP's include those having one or more of the following properties:

1) ethylene content of 25 to 80 wt % (preferably 30 to 75 wt %, preferably 35 to 70 wt %, preferably 40 to 65 wt %); and/or
2) diene content of 15 wt % or less (preferably 12 wt % or less, preferably 9 wt % or less, preferably 6 wt % or less, preferably 3 wt % or less, preferably 0 wt %); and/or
3) density of 0.87 g/cm$^3$ or less (preferably 0.865 g/cm$^3$ or less, preferably 0.86 g/cm$^3$ or less, preferably 0.855 g/cm$^3$ or less); and/or
4) heat of fusion ($H_f$), if detected, of less than 20 J/g (preferably less than 15 J/g, preferably less than 10 J/g, preferably less than 5 J/g, preferably a heat of fusion is indiscernible); and/or
5) ethylene or propylene crystallinity, if measurable, of less than 10 wt % (preferably less than 7.5 wt %, preferably less than 5 wt %, preferably less than 2.5 wt %, preferably crystallinity is undetected); and/or
6) melting point ($T_m$, peak first melt), if detected, of 60° C. or less (preferably 50° C. or less, preferably 40° C. or less, preferably 35° C. or less); and/or
7) glass transition temperature ($T_g$) of −30° C. or less (preferably −40° C. or less, preferably −50° C. or less, preferably −60° C. or less); and/or
8) $M_w$ of 50 to 3,000 kg/mol (preferably 100 to 2,000 kg/mol, preferably 200 to 1,000 kg/mol); and/or
9) $M_w/M_n$ of 1.5 to 40 (preferably 1.6 to 30, preferably 1.7 to 20, preferably 1.8 to 10, preferably 1.8 to 5, preferably 1.8 to 3, preferably 1.8 to 2.5); and/or
10) Mooney viscosity, ML(1+4) @ 125° C., of 10 to 100 (preferably 15 to 90, preferably 20 to 85).

Particularly, preferred EP Rubbers for use herein contain no diene (i.e., an ethylene-propylene copolymers). If diene is present (i.e., an ethylene-propylene-diene terpolymer), preferably the diene is a norbornene-derived diene such as ethylidene norbornene (ENB) or vinylidene norbornene (VNB). Diene content is measured by ASTM D 6047.

The method of making the EP Rubber is not critical, as it can be made by slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems or combinations thereof.

In a particularly preferred embodiment, the EP Rubbers useful herein are produced using a vanadium-based catalyst system in a solution or slurry process. In another embodiment, the EP Rubbers useful herein are produced using a metallocene-based catalyst system in a solution or slurry process. In yet another embodiment, the EP Rubbers useful herein are produced using any single-sited catalyst system in a solution or slurry process. Preferably, the EP Rubbers made by a vanadium, metallocene, or other single-sited catalyst system has a molecular weight distribution ($M_w/M_n$) of 1.8 to 2.5.

EP Rubbers that are useful in this invention include those available from ExxonMobil Chemical sold under the Vistalon™ tradename.

Ethylene Copolymers (Plastomers)

Preferred ethylene plastomers useful in this invention include those having one or more of the following properties:
1) ethylene content of 60 to 90 wt % (preferably 65 to 85 wt %, preferably 65 to 80 wt %, preferably 65 to 75 wt %), alternately the ethylene plastomer has an ethylene content of 80 to 96 mol % (preferably 82 to 92 mol %, preferably 82 to 88 mol %); and/or
2) propylene content of 10 to 20 wt %; and/or
3) butene-1 content of 15 wt % or more (preferably 20 wt % or more, preferably 25 wt % or more); and/or
4) hexene-1 content of 20 wt % or more (preferably 25 wt % or more, preferably 30 wt % or more); and/or
5) octene-1 content of 25 wt % or more (preferably 30 wt % or more, preferably 35 wt % or more); and/or 6) density of 0.91 to 0.86 g/cm³ (preferably 0.86 to 0.90 g/cm³, preferably 0.86 to 0.89 g/cm³, preferably 0.86 to 0.88 g/cm³, preferably 0.86 to 0.87 g/cm³); and/or 7) heat of fusion ($H_f$) of 90 J/g or less (preferably 70 J/g or less, preferably 50 J/g or less, preferably 30 J/g or less, preferably 10 to 70 J/g, preferably 10 to 50 J/g, preferably 10 to 30 J/g); and/or 8) crystallinity of 40% or less (preferably 30% or less, preferably 20% or less, preferably at least 5%, preferably 5 to 30%, preferably 5 to 20%); and/or 9) melting point ($T_m$, peak first melt) of 100° C. or less (preferably 90° C. or less, preferably 80° C. or less, preferably 70° C. or less, preferably 60° C. or less, preferably 50° C. or less); and/or 10) crystallization temperature ($T_c$, peak) of 90° C. or less (preferably 80° C. or less, preferably 70° C. or less, preferably 60° C. or less, preferably 50° C. or less, preferably 40° C. or less); and/or 11) glass transition temperature ($T_g$) of −20° C. or less (preferably −30° C. or less, preferably −40° C. or less); and/or 12) $M_w$ of 30,000 to 2,000,000 g/mol (preferably 50,000 to 1,000,000 g/mol, preferably 90,000 to 500,000 g/mol); and/or 13) $M_w/M_n$ of 1 to 40 (preferably 1.4 to 20, preferably 1.6 to 10, preferably 1.8 to 3.5, preferably 1.8 to 2.5); and/or 14) branching index (g') of 0.9 or greater (preferably 0.95 or greater, preferably 0.99 or greater); and/or 15) melt index (MI) of 0.1 to 100 dg/min (preferably 0.3 to 60 dg/min, preferably 0.5 to 40 dg/min, preferably 0.7 to 20 dg/min); and/or 16) CDBI of at least 60 wt % (preferably at least 70 wt %, preferably at least 80 wt %, preferably at least 90 wt %, preferably at least 95 wt %).

In any embodiment, the ethylene plastomer can be a random copolymer, a statistical copolymer, a block copolymer, and blends thereof.

The method of making the ethylene plastomer is not critical, as it can be made by slurry, solution, gas-phase, high-pressure, or other suitable processes, through the use of catalyst systems appropriate for the polymerization of polyolefins, such as metallocene catalysts, other appropriate catalyst systems or combinations thereof.

In a particularly preferred embodiment, the ethylene plastomers useful herein are produced using a metallocene catalyst system, i.e., a mono- or bis-cyclopentadienyl transition metal catalysts in combination with an activator of alumoxane and/or a non-coordinating anion in solution, slurry, high-pressure, or gas-phase. The catalyst and activator may be supported or unsupported and the cyclopentadienyl rings by may substituted or unsubstituted. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO 91/09882; WO 94/03506; and U.S. Pat. No. 5,055,438. More generally, preferred plastomers are produced using a single-site catalyst, whether a metallocene catalyst or not, and have a $M_w/M_n$ of 1.5 to 3 (preferably 1.8 to 2.5) and a CDBI of 70% or more (preferably 80% or more, preferably 90% or more).

Ethylene plastomers that are useful in this invention include those available from ExxonMobil Chemical (sold under the EXACT™ tradename), Dow Chemical (sold under the AFFINITY™, ENGAGE™, and FLEXOMER™ tradenames), and Mitsui Chemicals (sold under the TAFMER™ tradename). Examples include:

| ExxonMobil Chemical EXACT ™ Plastomers | | | | |
|---|---|---|---|---|
| Grade | Comonomer | Density (g/cm³) | Melt-Index (dg/min) | DSC Melting Peak (° C., 10° C./min) |
| 3128 | butene | 0.900 | 1.2 | 92 |
| 4011 | butene | 0.888 | 2.2 | 70 |
| 4033 | butene | 0.880 | 0.8 | 60 |
| 3132 | hexene | 0.900 | 1.2 | 96 |
| 4056 | hexene | 0.883 | 2.2 | 72 |
| 4151 | hexene | 0.895 | 2.2 | 89 |
| 0201 | octene | 0.902 | 1.1 | 95 |
| 0203 | octene | 0.902 | 3.0 | 95 |
| 5061 | octene | 0.868 | 0.5 | 53 |
| 5062 | octene | 0.860 | 0.5 | 43 |
| 5101 | octene | 0.902 | 1.1 | 98 |
| 5171 | octene | 0.870 | 1.0 | 55 |
| 5181 | octene | 0.882 | 1.1 | 73 |
| 5361 | octene | 0.860 | 3.0 | 36 |
| 8201 | octene | 0.882 | 1.1 | 67 |
| 8203 | octene | 0.882 | 3.0 | 73 |

Non-Functionalized Plasticizer (NFP)

We have discovered that addition of one or more NFPs improves the overall performance of specific polypropylene-based TPO/Plastomer compositions that meet the stringent array of requirements for processing on PVC milling and or calendering equipment.

The blend compositions of the present invention include at least one non-functionalized plasticizer ("NFP"). The classes of materials described herein that are useful as non-functionalized plasticizers can be utilized alone or admixed other NFPs described herein to obtain desired properties. Any NFP useful in the present invention may also be described by any number of, or any combination of, parameters described herein.

An NFP is defined to be a hydrocarbon liquid compound comprising carbon and hydrogen, having functional groups selected from hydroxide, aryls, substituted aryls, halogens, alkoxys, carboxylates, esters, carbon unsaturation, acrylates, oxygen, nitrogen, and carboxyl present to an unappreciable extent. By "unappreciable extent", it is meant that these groups and compounds comprising these groups are not deliberately added to the NFP, and if present at all for any reason, are present at less than 1 wt %. Preferably the these groups and compounds are present at less than 0.7 wt %, preferably less than 0.5 wt %, preferably less than 0.3 wt %, preferably less than 0.1 wt %, preferably less than 0.05 wt %, preferably less than 0.01 wt %, preferably less than 0.001 wt %, preferably 0 wt %), based upon the weight of the NFP.

In one embodiment, aromatic moieties (including compounds whose molecules have the ring structure characteristic of benzene, naphthalene, phenanthrene, anthracene, etc.) are substantially absent from the NFP. In another embodiment, naphthenic moieties (including compounds whose molecules have a saturated ring structure such as would be produced by hydrogenating benzene, naphthalene, phenanthrene, anthracene, etc.) are substantially absent from the NFP.

In another embodiment, the NFP is a hydrocarbon that contains olefinic unsaturation to an unappreciable extent. By "unappreciable extent of olefinic unsaturation" it is meant that the carbons involved in olefinic bonds account for less than 10% (preferably less than 8%, preferably less than 6%, preferably less than 4%, preferably less than 2%, preferably less than 1%, preferably less than 0.7%, preferably less than 0.5%, preferably less than 0.3%, preferably less than 0.1%, preferably less than 0.05%, preferably less than 0.01%, preferably less than 0.001%) of the total number of carbons. In some embodiments, the percent of carbons of the NFP involved in olefinic bonds is between 0.001 and 10% of the total number of carbon atoms in the NFP (preferably between 0.01 and 5%, preferably between 0.1 and 2%, preferably less than 1%, preferably at 0 wt %).

In another embodiment, the NFP comprises $C_6$ to $C_{200}$ paraffins, and $C_8$ to $C_{100}$ paraffins in another embodiment. In another embodiment, the NFP consists essentially of $C_6$ to $C_{200}$ paraffins, or essentially of $C_8$ to $C_{100}$ paraffins in another embodiment. In yet another embodiment, the NFP comprises $C_{20}$ to $C_{1500}$ paraffins, preferably $C_{25}$ to $C_{500}$ paraffins, preferably $C_{25}$ to $C_{500}$ paraffins, preferably $C_{30}$ to $C_{500}$ paraffins, preferably $C_{40}$ to $C_{500}$ paraffins, preferably $C_{40}$ to $C_{250}$ paraffins, preferably $C_{30}$ to $C_{150}$ paraffins, preferably $C_{20}$ to $C_{100}$ paraffins. In a preferred embodiment, the NFP comprises oligomers of $C_5$ to $C_{24}$ olefins.

Particularly preferred NFPs include PAOs, and high purity hydrocarbon fluids derived from a so-called Gas-To-Liquids processes, with a viscosity index greater than 100 (preferably greater than 120), pour point less than −20° C. (preferably less than −30° C.), specific gravity less than 0.86 (preferably less than 0.855), and flash point greater than 200° C. (preferably greater than 230° C.).

In any of the above embodiments of the blend composition, the NFP preferably has a kinematic viscosity at 100° C. of 5 to 100 cSt (preferably 6 to 80 cSt, preferably 6 to 20 cSt), a viscosity index of 100 or more (preferably 110 or more, preferably 120 or more, preferably 130 or more), a pour point of −15° C. or less (preferably −20° C. or less, preferably −25° C. or less, preferably −30° C. or less), a flash point of 200° C. or more (preferably 220° C. or more, preferably 240° C. or more, preferably 260° C. or more), and a specific gravity of 0.88 or less (preferably 0.87 or less, preferably 0.865 or less, preferably 0.86 or less).

Polyalphaolefins

In another embodiment of the present invention, the NFP comprises a polyalphaolefin (PAO) liquid with a pour point of −20° C. or less and a kinematic viscosity at 100° C. of 5 to 100 cSt. In general, a PAO liquid comprises hydrocarbon oligomers manufactured by catalytic oligomerization of alpha-olefins, preferably linear alpha-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. No. 3,149,178; U.S. Pat. No. 4,827,064; U.S. Pat. No. 4,827,073; U.S. Pat. No. 5,171,908; and U.S. Pat. No. 5,783,531 and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), p. 3-52. A PAO is not a polymer.

PAO liquids may be conveniently prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one embodiment, the PAO comprises $C_{15}$ to $C_{1500}$ (preferably $C_{20}$ to $C_{1000}$, preferably $C_{30}$ to $C_{800}$, preferably $C_{35}$ to $C_{400}$, most preferably $C_{40}$ to $C_{250}$) oligomers of alpha-olefins. These oligomers are dimers, trimers, tetramers, pentamers, etc. In another embodiment, the PAO comprises $C_3$ to $C_{24}$ (preferably $C_5$ to $C_{18}$, preferably $C_6$ to $C_{14}$, even preferably $C_8$ to $C_{12}$, most preferably $C_{10}$) branched or linear alpha-olefins, provided that $C_3$ and $C_4$ alpha-olefins are present at 10 wt % or less. In another embodiment, the PAO comprises $C_3$ to $C_{24}$ (preferably $C_5$ to $C_{18}$, preferably $C_6$ to $C_{14}$, most preferably $C_8$ to $C_{12}$) linear alpha-olefins (LAOs), provided that $C_3$ and $C_4$ LAOs are present at 10 wt % or less. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred.

In one embodiment, a single LAO is used to prepare the oligomers. In this case, a preferred embodiment involves the oligomerization of 1-decene, and the PAO is a mixture of oligomers (including, for example, dimers, trimers, tetramers, pentamers, and higher) of 1-decene. In another embodiment, the PAO comprises oligomers of two or more $C_3$ to $C_{18}$ LAOs (preferably $C_5$ to $C_{18}$ LAOs), to make 'bipolymer' or 'terpolymer' or higher-order copolymer combinations, provided that $C_3$ and $C_4$ LAOs are present at 10 wt % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In another embodiment, the PAO comprises oligomers of a single alpha-olefin species having a carbon number of 5 to 24 (preferably 6 to 18, preferably 8 to 12, most preferably 10). In another embodiment, the PAO comprises oligomers of mixed alpha-olefins (i.e., involving two or more alpha-olefin species), each alpha-olefin having a carbon number of 3 to 24 (preferably 5 to 24, preferably 6 to 18, most preferably 8 to 12), provided that alpha-olefins having a carbon number of 3 or 4 are present at 10 wt % or less. In a particularly preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

Preferred PAOs have a "branching ratio" as defined in U.S. Pat. No. 4,827,064 and measured according to the method described therein, of 0.20 or less (preferably 0.19 or less, preferably 0.18 or less, preferably 0.17 or less, preferably 0.15 or less, preferably 0.12 or less, preferably 0.10 or less).

In one embodiment of the present invention, the PAO has a number average molecular weight of from 100 to 20,000 g/mol (preferably 300 to 15,000 g/mol, preferably 400 to 10,000 g/mol, preferably 500 to 5,000 g/mol, preferably 600 to 3,000 g/mol, preferably 600 to 1,500 g/mol).

In a preferred embodiment, the PAO has a kinematic viscosity at 100° C. of 4 cSt or more (preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In another embodiment, the PAO has a kinematic viscosity at 100° C. of 300 cSt or less (preferably 100 cSt or less). In another embodiment, the PAO has a kinematic viscosity at 100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In another embodiment, the PAO has a kinematic viscosity at 100° C. of 10 to 1000 cSt (preferably 10 to 300 cSt, preferably 10 to 100 cSt). In yet another embodiment, the PAO has a kinematic viscosity at 100° C. of about 4 to about 8 cSt.

In another preferred embodiment, the PAO has a Viscosity Index of 120 or more (preferably 130 or more, preferably 140 or more, preferably 150 or more, preferably 170 or more, preferably 190 or more, preferably 200 or more, preferably 250 or more, preferably 300 or more). In another embodiment, the PAO or blend of PAOs has a viscosity Index of 120 to 350 (preferably 130 to 250).

In yet another preferred embodiment, the PAO has a pour point of −20° C. or less (preferably −25° C. or less, preferably −30° C. or less, preferably −35° C. or less, preferably −40° C. or less, preferably −50° C. or less). In another embodiment, the PAO or blend of PAOs has a pour point of −15 to −70° C. (preferably −25 to −60° C.).

In yet another embodiment, the PAO has a glass transition temperature ($T_g$) of −40° C. or less (preferably −50° C. or less, preferably −60° C. or less, preferably −70° C. or less, preferably −80° C. or less). In another embodiment, the PAO or blend of PAOs has a $T_g$ of −50 to −120° C. (preferably −60 to −100° C., preferably −70 to −90° C.).

In yet another embodiment, the PAO has a flash point of 200° C. or more (preferably 210° C. or more, preferably 220° C. or more, preferably 230° C. or more), preferably between 240° C. and 290° C.

In yet another embodiment, the PAO has a specific gravity (15.6/15.6° C.) of 0.86 or less (preferably 0.855 or less, preferably 0.85 or less, preferably 0.84 or less).

Particularly preferred PAOs are those having A) a flash point of greater than 200° C. (preferably 210° C. or more, preferably 220° C. or more, preferably 230° C. or more); and B) a pour point less than −20° C. (preferably less than −25° C., preferably less than −30° C., preferably less than −35° C., preferably less than −40° C.) and/or a kinematic viscosity at 100° C. of 10 cSt or more (preferably 35 cSt or more, preferably 40 cSt or more, preferably 50 cSt or more).

The PAO may be comprised of one or more distinct PAO components. In one embodiment, the NFP is a blend of one or more PAOs with different compositions (e.g., different α-olefin(s) were used to make the oligomers) and/or different physical properties (e.g., kinematic viscosity, pour point, viscosity index, and/or glass transition temperature).

Desirable PAOs are available as SpectraSyn™ and SpectraSyn Ultra™ tradenames from ExxonMobil Chemical in Houston, Tex. (previously sold under the SHF and SuperSyn™ tradenames by ExxonMobil Chemical Company), some of which are summarized in the table below. Other useful PAOs include Synfluid™ available from ChevronPhillips Chemical Company (Pasadena, Tex.), Durasyn™ available from Innovene (Chicago, Ill.), Nexbase™ available from Neste Oil (Keilaniemi, Finland), and Synton™ available from Chemtura Corporation (Middlebury, Conn.). The percentage of carbons in chain-type paraffinic structures ($C_P$) is close to 100% (typically greater than 98% or even 99%) for PAOs.

| SpectraSyn™ Series Polyalphaolefins | | | | | | |
|---|---|---|---|---|---|---|
| Grade ID | KV @ 100° C., cSt | KV @ 40° C., cSt | VI | Pour Point, ° C. | Specific gravity at 15.6° C. | Flash Point, ° C. |
| 4 | 4 | 19 | 126 | −66 | 0.820 | 220 |
| Plus 4 | 4 | 17 | 122 | −60 | 0.820 | 228 |
| 6 | 6 | 31 | 138 | −57 | 0.827 | 246 |
| Plus 6 | 6 | 30 | 140 | −54 | 0.827 | 246 |
| 8 | 8 | 48 | 135 | −54 | 0.833 | 260 |
| 10 | 10 | 66 | 136 | −54 | 0.835 | 266 |
| 40 | 39 | 396 | 147 | −36 | 0.850 | 281 |
| 100 | 100 | 1240 | 170 | −30 | 0.853 | 283 |
| Ultra 150 | 150 | 1,500 | 218 | −33 | 0.850 | >265 |
| Ultra 300 | 300 | 3,100 | 241 | −27 | 0.852 | >265 |
| Ultra 1000 | 1,000 | 10,000 | 307 | −18 | 0.855 | >265 |

This invention also relates to blend compositions comprising one or more impact copolymers (preferably a polypropylene-based TPO), one or more ethylene plastomers, and one or more non-functionalized plasticizers where the non-functionalized plasticizer comprises a polyalphaolefin comprising oligomers of $C_5$ to $C_{18}$ olefins (preferably $C_6$ to $C_{14}$, preferably $C_8$ to $C_{12}$, preferably $C_{10}$); having a kinematic viscosity at 100° C. of 5 cSt or more (preferably 8 cSt or more, preferably 10 cSt or more); a viscosity index of 120 or more (preferably 130 or more); and a pour point of −20° C. or less (preferably −30° C. or less, preferably −40° C. or less).

High Purity Hydrocarbon Fluids

In another embodiment, the NFP is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant basestock or oil, which includes:

1. hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and 2. hydroisomerized synthetic waxes, such as Fischer-Tropsch waxes (i.e., the high boiling point residues of Fischer-Tropsch synthesis, including waxy hydrocarbons); or mixtures thereof. Most preferred are lubricant basestocks or oils derived from hydrocarbons synthesized in a Fischer-Tropsch process as part of an overall Gas-to-Liquids (GTL) process.

In one embodiment, the mixture of paraffins has two or more of the following properties:

1. a naphthenic content of less than 40 wt % (preferably less than 30 wt %, preferably less than 20 wt %, preferably less than 15 wt %, preferably less than 10 wt %, preferably less than 5 wt %, preferably less than 2 wt %, preferably less than 1 wt %) based on the total weight of the hydrocarbon mixture; and/or
2. a normal paraffins content of less than 5 wt % (preferably less than 4 wt %, preferably less than 3 wt %, preferably less than 1 wt %) based on the total weight of the hydrocarbon mixture; and/or
3. an aromatic content of 1 wt % or less (preferably 0.5 wt % or less); and/or
4. a saturates level of 90 wt % or higher (preferably 95 wt % or higher, preferably 98 wt % or higher, preferably 99 wt % or higher); and/or
5. the percentage of carbons in chain-type paraffinic structures ($C_P$) of 80% or more (preferably 90% or more, preferably 95% or more, preferably 98% or more); and/or
6. a branched paraffin:normal paraffin ratio greater than about 10:1 (preferably greater than 20:1, preferably greater than 50:1, preferably greater than 100:1, preferably greater than 500:1, preferably greater than 1000:1); and/or
7. sidechains with 4 or more carbons making up less than 10% of all sidechains (preferably less than 5%, preferably less than 1%); and/or
8. sidechains with 1 or 2 carbons making up at least 50% of all sidechains (preferably at least 60%, preferably at least 70%, preferably at least 80%, preferably at least 90%, preferably at least 95%, preferably at least 98%); and/or
9. a sulfur content of 300 ppm or less (preferably 100 ppm or less, preferably 50 ppm or less, preferably 10 ppm or less) where ppm is on a weight basis; and/or
10. a nitrogen content of 300 ppm or less (preferably 100 ppm or less, preferably 50 ppm or less, preferably 10 ppm or less) where ppm is on a weight basis; and/or
11. a number-average molecular weight of 300 to 1800 g/mol (preferably 400 to 1500 g/mol, preferably 500 to 1200 g/mol, preferably 600 to 900 g/mol); and/or
12. a kinematic viscosity at 40° C. of 10 cSt or more (preferably 25 cSt or more, preferably between about 50 and about 400 cSt); and/or
13. a kinematic viscosity at 100° C. ranging from 2 to 50 cSt (preferably 3 to 30 cSt, preferably 5 to 25 cSt, preferably 6 to 20 cSt, preferably 8 to 16 cSt); and/or
14. a viscosity index (VI) of 80 or greater (preferably 100 or greater, preferably 120 or greater, preferably 130 or greater, preferably 140 or greater, preferably 150 or greater, preferably 160 or greater, preferably 180 or greater); and/or
15. a pour point of −5° C. or lower (preferably −10° C. or lower, preferably −15° C. or lower, preferably −20° C. or lower, preferably −25° C. or lower, preferably −30° C. or lower); and/or
16. a flash point of 200° C. or more (preferably 220° C. or more, preferably 240° C. or more, preferably 260° C. or more); and/or
17. a specific gravity (15.6° C./15.6° C.) of 0.86 or less (preferably 0.85 or less, preferably 0.84 or less); and/or
18. an aniline point of 120° C. or more; and/or
19. a bromine number of 1 or less.

In a preferred embodiment, the mixture of paraffins comprises a GTL basestock or oil. GTL basestocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and $H_2$) derived from a suitable source, such as natural gas and/or coal. GTL basestocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL basestocks and oils may further comprise other hydroisomerized basestocks and base oils. Particularly preferred GTL basestocks or oils are those comprising mostly hydroisomerized F-T waxes and/or other liquid hydrocarbons obtained by a F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant basestock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350; often used in conjunction with a Group VIII metal such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL basestocks and oils, Fischer-Tropsch hydrocarbon derived basestocks and oils, and wax isomerate hydroisomerized basestocks and oils are described in, for example, U.S. Pat. No. 2,817,693; U.S. Pat. No. 4,542,122; U.S. Pat. No. 5,545,674; U.S. Pat. No. 4,568,663; U.S. Pat. No. 4,621,072; U.S. Pat. No. 4,663,305; U.S. Pat. No. 4,897,178; U.S. Pat. No. 4,900,407; U.S. Pat. No. 4,921,594; U.S. Pat. No. 4,923,588; U.S. Pat. No. 4,937,399; U.S. Pat. No. 4,975,177; U.S. Pat. No. 5,059,299; U.S. Pat. No. 5,158,671; U.S. Pat. No. 5,182,248; U.S. Pat. No. 5,200,382; U.S. Pat. No. 5,290,426; U.S. Pat. No. 5,516,740; U.S. Pat. No. 5,580,442; U.S. Pat. No. 5,885,438; U.S. Pat. No. 5,935,416; U.S. Pat. No. 5,935,417; U.S. Pat. No. 5,965,475; U.S. Pat. No. 5,976,351; U.S. Pat. No.

5,977,425; U.S. Pat. No. 6,025,305; U.S. Pat. No. 6,080,301; U.S. Pat. No. 6,090,989; U.S. Pat. No. 6,096,940; U.S. Pat. No. 6,103,099; U.S. Pat. No. 6,165,949; U.S. Pat. No. 6,190,532; U.S. Pat. No. 6,332,974; U.S. Pat. No. 6,375,830; U.S. Pat. No. 6,383,366; U.S. Pat. No. 6,475,960; U.S. Pat. No. 6,620,312; U.S. Pat. No. 6,676,827; EP 324528; EP 532116; EP 532118; EP 537815; EP 583836; EP 666894; EP 668342; EP 776959; WO 97/31693; WO 99/20720; WO 99/45085; WO 02/64710; WO 02/64711; WO 02/70627; WO 02/70629; WO 03/33320; and British Patents 1350257; 1390359; 1429494; and 1440230. Particularly, favorable processes are described in European Patent Applications EP 464546 and EP 464547. Processes using Fischer-Tropsch wax feeds are described in U.S. Pat. No. 4,594,172; U.S. Pat. No. 4,943,672; U.S. Pat. No. 6,046,940; U.S. Pat. No. 6,103,099; U.S. Pat. No. 6,332,974; U.S. Pat. No. 6,375,830; and U.S. Pat. No. 6,475,960.

This invention also relates to plasticized blend compositions where the NFP(s) is/are high purity hydrocarbon fluid(s) derived from a GTL process comprising a mixture of paraffins of carbon number ranging from about $C_{20}$ to about $C_{100}$, a molar ratio of isoparaffins:n-paraffins greater than about 50:1, the percentage of carbons in paraffinic structures ($C_P$) of 98% or more, a pour point ranging from about $-20°$ C. to about $-60°$ C., and a kinematic viscosity at $100°$ C. ranging from about 6 to about 20 cSt.

As used herein, the following terms have the indicated meanings: "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of $0°$ C. or above, and consisting predominantly of paraffinic molecules, most of which are normal paraffins; "slack wax" is the wax recovered from petroleum oils such as by solvent dewaxing; and may be further hydrotreated to remove heteroatoms.

Preferably, the NFP is not a naphthenic mineral oil (also called a naphthenic process oil or a naphthenic extender oil), nor is it an aromatic mineral oil (also called an aromatic process oil or an aromatic extender oil). More preferably, naphthenic and aromatic mineral oils are substantially absent from the compositions of the present invention. In certain embodiments, paraffinic mineral oils with a kinematic viscosity at $40°$ C. of less than 80 cSt and a pour point of greater than $-15°$ C. are substantially absent from the compositions of the present invention.

In an alternate embodiment, the plasticizer may be an NFP as described at page 12, paragraph [0222] to page 19, paragraph [0315] of US 2008-0045638.

General Characteristics of Useful NFPs

In preferred embodiments, the NFP has a kinematic viscosity at $100°$ C. ($KV_{100}$) of 4 cSt or more, preferably 5 cSt or more, preferably 6 cSt or more, preferably 8 cSt or more, preferably 10 cSt or more, preferably 4 to 300 cSt, preferably 8 to 200 cSt, preferably 6 to 150 cSt, preferably 10 to 100 cSt, preferably less than 50 cSt, wherein a desirable range may be any combination of any lower $KV_{100}$ limit with any upper $KV_{100}$ limit described herein.

In preferred embodiments, the NFP has a pour point of $-20°$ C. or less, preferably $-25°$ C. or less, preferably $-30°$ C. or less, preferably $-40°$ C. or less, preferably $-45°$ C. or less, preferably $-50°$ C. or less, preferably $-10$ to $-100°$ C., preferably $-15$ to $-80°$ C., preferably $-15$ to $-75°$ C., preferably $-20$ to $-70°$ C. or less, preferably $-25$ to $-65°$ C., preferably greater than $-120°$ C., wherein a desirable range may be any combination of any lower pour point limit with any upper pour point limit described herein. In another embodiment, the NFP has a pour point of less than $-30°$ C. when the kinematic viscosity at $40°$ C. is from 20 to 600 cSt (preferably 30 to 400 cSt, preferably 40 to 300 cSt). Most mineral oils, which typically include aromatic moieties and other functional groups, have a pour point of from 10 to $-20°$ C. in the same kinematic viscosity range.

In a preferred embodiment, the NFP has a glass transition temperature ($T_g$) of $-40°$ C. or less, preferably $-50°$ C. or less, preferably $-60°$ C. or less, preferably $-70°$ C. or less, preferably $-80°$ C. or less, preferably $-45$ to $-120°$ C., preferably $-65$ to $-90°$ C., wherein a desirable range may be any combination of any lower $T_g$ limit with any upper $T_g$ limit described herein.

In preferred embodiments, the NFP has a Viscosity Index (VI) of 100 or more, preferably 110 or more, preferably 120 or more, preferably 130 or more, preferably 115 to 350, preferably 135 to 300, preferably 140 to 250, preferably 150 to 200, preferably 125 to 180, wherein a desirable range may be any combination of any lower VI limit with any upper VI limit described herein.

In preferred embodiments, the NFP has a flash point of greater than $200°$ C., preferably $210°$ C. or greater, preferably $230°$ C. or greater, preferably 200 to $350°$ C., preferably 210 to $300°$ C., preferably 215 to $290°$ C., preferably 220 to $280°$ C., preferably 240 to $280°$ C., wherein a desirable range may be any combination of any lower flash point limit with any upper flash point limit described herein.

In preferred embodiments, the NFP has a specific gravity of 0.86 or less, preferably 0.855 or less, preferably 0.84 or less, preferably 0.78 to 0.86, preferably 0.79 to 0.855, preferably 0.80 to 0.85, preferably 0.81 to 0.845, preferably 0.82 to 0.84, wherein a desirable range may be any combination of any lower specific gravity limit with any upper specific gravity limit described herein.

In preferred embodiments, the NFP has a number-average molecular weight ($M_n$) of 250 g/mol or more, preferably 300 g/mol or more, preferably 500 g/mol or more, preferably 300 to 21,000 g/mol, preferably 300 to 10,000 g/mol, preferably 400 to 5,000 g/mol, preferably 500 to 3,000 g/mol, preferably 10 kg/mol or less, preferably 5 kg/mol or less, preferably 3 kg/mol or less, preferably 2 kg/mol or less, preferably 1 kg/mol or less, wherein a desirable range may be any combination of any lower $M_n$ limit with any upper $M_n$ limit described herein.

In preferred embodiments, the NFP has a low degree of color, such as typically identified as "water white", "prime white", "standard white", or "bright and clear", preferably an APHA color of 100 or less (preferably 80 or less, preferably 60 or less, preferably 40 or less, preferably 20 or less).

In other embodiments, any NFP may have an initial boiling point of from 300 to $600°$ C. (preferably 350 to $500°$ C., preferably greater than $400°$ C.).

Any of the NFPs for use in the present invention may be described by any embodiment described herein, or any combination of the embodiments described herein. For example, in one embodiment, the NFP is a $C_6$ to $C_{200}$ paraffin having a pour point of less than $-25°$ C. Alternately, the NFP comprises an aliphatic hydrocarbon having a kinematic viscosity of from 0.1 to 1000 cSt at $100°$ C. Alternately, the NFP is selected from isoparaffins and PAOs and blends thereof having from 8 to 25 carbon atoms.

In another embodiment, the NFP of the present invention comprises $C_{25}$ to $C_{1500}$ paraffins, and $C_{30}$ to $C_{500}$ paraffins in another embodiment, and has a flash point of $200°$ C. or more and a pour point of $-10°$ C. or less and a viscosity index of 120 or more. Alternately the NFP comprises $C_{25}$ to $C_{1500}$ paraffins, preferably $C_{30}$ to $C_{500}$ paraffins, and has a flash point of 200° C. or more and a pour point of −20° C. or less. Alternately the NFP comprises $C_{25}$ to $C_{1500}$ paraffins, preferably $C_{30}$ to $C_{500}$ paraffins, and has a flash point of 200° C. or more and a kinematic viscosity at 100° C. of 35 cSt or more. In another embodiment, the NFP consists essentially of $C_{35}$ to $C_{300}$ paraffins, preferably the NFP consists essentially of $C_{40}$ to $C_{250}$ paraffins, and has a flash point of 200° C. or more and a pour point of −10° C. or less and a viscosity index of 120 or more. Alternately the NFP consists essentially of $C_{35}$ to $C_{300}$ paraffins, preferably $C_{40}$ to $C_{250}$ paraffins, and has a flash point of 200° C. or more and a pour point of −20° C. or less. Alternately the NFP consists essentially of $C_{35}$ to $C_{300}$ paraffins, preferably $C_{40}$ to $C_{250}$ paraffins, and has a flash point of 200° C. or more and a kinematic viscosity at 100° C. of 35 cSt or more. Alternately the NFP has a flash point of 200° C. or more and a pour point of −20° C. or less. Alternately the NFP has a flash point of 200° C. or more and a kinematic viscosity at 100° C. of 35 cSt or more.

In a preferred embodiment, any NFP described herein has a flash point of 200° C. or more (preferably 210° C. or more) and a pour point of −20° C. or less (preferably −25° C. or less, preferably −30° C. or less, preferably −35° C. or less, preferably −45° C. or less, preferably −50° C. or less).

In another preferred embodiment, the NFP has a flash point of 220° C. or more (preferably 230° C. or more) and a pour point of −10° C. or less (preferably −25° C. or less, preferably −30° C. or less, preferably −35° C. or less, preferably −45° C. or less, preferably −50° C. or less).

In another preferred embodiment, the NFP has a kinematic viscosity at 100° C. of 35 cSt or more (preferably 40 cSt or more, preferably 50 cSt or more, preferably 60 cSt or more) and a specific gravity (15.6/15.6° C.) of 0.87 or less (preferably 0.865 or less, preferably 0.86 or less, preferably 0.855 or less) and a flash point of 200° C. or more (preferably 230° C. or more).

In another preferred embodiment, the NFP has a) a flash point of 200° C. or more; b) a specific gravity of 0.86 or less; and c1) a pour point of −10° C. or less and a viscosity index of 120 or more, or c2) a pour point of −20° C. or less, or c3) a kinematic viscosity at 100° C. of 35 cSt or more.

In another preferred embodiment, the NFP has a) a specific gravity (15.6/15.6° C.) of 0.85 or less (preferably between 0.80 and 0.85); and b1) a kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or b2) a number-average molecular weight ($M_n$) of at least 280 g/mol.

In another preferred embodiment, the NFP has a) a specific gravity (15.6/15.6° C.) of 0.86 or less (preferably between 0.81 and 0.855, preferably between 0.82 and 0.85); and b1) a kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more) and/or b2) a number-average molecular weight ($M_n$) of at least 420 g/mol (preferably at least 450 g/mol, preferably at least 480 g/mol, preferably at least 500 g/mol).

In another preferred embodiment, the NFP has a) a specific gravity (15.6/15.6° C.) of 0.87 or less (preferably between 0.82 and 0.87); and b1) a kinematic viscosity at 100° C. of 10 cSt or more (preferably 12 cSt or more, preferably 15 cSt or more, preferably 20 cSt or more, preferably 30 cSt or more, preferably 40 cSt or more); and/or b2) a number-average molecular weight ($M_n$) of at least 700 g/mol (preferably at least 800 g/mol, preferably at least 900 g/mol, preferably at least 1000 g/mol).

In another preferred embodiment, the NFP has a) a specific gravity (15.6/15.6° C.) of 0.88 or less (preferably 0.87 or less, preferably between 0.82 and 0.87); and b1) a kinematic viscosity at 100° C. of 15 cSt or more (preferably 20 cSt or more, preferably 25 cSt or more, preferably 30 cSt or more, preferably 40 cSt or more); and/or b2) a number-average molecular weight ($M_n$) of at least 840 g/mol (preferably at least 900 g/mol).

In another preferred embodiment the NFP has a kinematic viscosity at 100° C. of 3 to 3000 cSt (preferably 6 to 300 cSt, preferably 8 to 100 cSt); and a number average molecular weight ($M_n$) of 300 to 21,000 g/mol (preferably 500 to 5,000 g/mol, preferably 600 to 3,000 g/mol).

In another preferred embodiment the NFP has a kinematic viscosity at 100° C. of 3 to 500 cSt (preferably 6 to 200 cSt, preferably 8 to 100 cSt, preferably 8 to 25 cSt); and a number average molecular weight ($M_n$) of 300 to 10,000 g/mol (preferably 400 to 5,000 g/mol, preferably 500 to 2,500 g/mol, preferably 300 to 1,200 g/mol).

In another preferred embodiment the NFP has a kinematic viscosity at 100° C. of 3 to 100 cSt (preferably 4 to 50 cSt, preferably 6 to 25 cSt, preferably 6 to 15 cSt); and a number average molecular weight ($M_n$) of 300 to 3,000 g/mol (preferably 350 to 2,000 g/mol, preferably 400 to 1,000 g/mol, preferably 300 to 800 g/mol).

In another preferred embodiment, the NFP has a pour point of −25° C. or less (preferably between −30° C. and −90° C.), and a kinematic viscosity in the range of from 20 to 5000 cSt at 40° C. In another preferred embodiment, the NFP has a pour point of −25° C. or less and a Mn of 400 g/mol or greater. Most mineral oils, which typically include functional groups, have a pour point of from 10° C. to −25° C. at the same viscosity and molecular weight ranges.

In another preferred embodiment the NFP has a glass transition temperature ($T_g$) that cannot be determined by ASTM E 1356 or, if it can be determined, then the $T_g$ according to ASTM E 1356 is less than −20° C. (preferably less than −30° C., preferably less than −40° C.), and has one or more of the following properties:
1. a pour point of −10° C. or less (preferably −15° C. or less, preferably −25° C. or less, preferably −35° C. or less, preferably −45° C. or less); and/or
2. a weight average molecular weight ($M_w$) between 30,000 and 400 g/mol (preferably between 15,000 and 500 g/mol, preferably between 5,000 and 600 g/mol); and/or
3. a number average molecular weight ($M_n$) between 10,000 and 400 g/mol (preferably between 5,000 and 500 g/mol, preferably between 2,000 and 600 g/mol); and/or
4. a flash point of 200° C. or greater; and/or
5. a specific gravity (15.6/15.6° C.) of less than 0.88 (preferably less than 0.86, preferably less than 0.84, preferably from 0.80 to 0.88, preferably from 0.82 to 0.86); and/or
6. an initial boiling point greater than 300° C. (preferably greater than 350° C., preferably greater than 400° C.); and/or
7. a final boiling point of from 300° C. to 800° C. (preferably from 400° C. to 700° C., preferably greater than 500° C.).

In certain particularly preferred embodiments, the NFP has a specific gravity of 0.86 or less (preferably 0.855 or less, preferably 0.85 or less), and one or more of the following:
a) a VI of 120 or more (preferably 135 or more, preferably 140 or more); and/or
b) a flash point of 200° C. or more (preferably 220° C. or more, preferably 240° C. or more).

In certain particularly preferred embodiments, the NFP has a pour point of −10° C. or less (preferably −15° C. or less, preferably −20° C. or less, preferably −25° C. or less), a VI of 120 or more (preferably 135 or more, preferably 140 or more), and optionally a flash point of 200° C. or more (preferably 220° C. or more, preferably 240° C. or more).

In a preferred embodiment, the percentage of carbons in chain-type paraffins ($C_P$) for any NFP is at least 80% (preferably at least 85%, preferably at least 90%, even preferably at least 95%, even preferably at least 98%, most preferably at least 99%).

Fillers

The blend compositions of the present invention may include at least one filler. The filler may be inorganic mineral particulates, inorganic fibers, or engineering thermoplastic fibers. In any of the embodiments described herein, preferably the filler is an inorganic mineral filler with a median particle diameter of less than 50 microns. The classes of materials described herein that are useful as fillers can be utilized alone or admixed to obtain desired properties. In any of the embodiments, filler may be present at 0.1 to 50 wt % (preferably 0.5 to 45 wt %, preferably 1 to 40 wt %, preferably 2 to 30 wt %, preferably 5 to 20 wt %) based on the weight of the total composition. Filler content is equated with the wt % ash content as determined by the ISO 3451-1 (A) test method.

In preferred embodiments the filler has a median particle diameter of 0.1-100 microns (preferably 0.5-50 microns, preferably 1 to 20 microns). In other preferred embodiments the filler has a filler shape that is needle-like or plate-like, with an aspect ratio greater than 1.2 (preferably greater than 2, preferably greater than 3, preferably greater than 5, preferably greater than 10, preferably from 2 to 20, preferably from 3-10), where the aspect ratio is the ratio of the longest dimension to the shortest dimension of the particles, on average, and is typically reported by filler manufacturers. In other embodiments the filler has an aspect ratio of essentially 1 (0.9 to 1.1); i.e., it is not needle-like or plate-like but is essentially spherical. In another embodiment, the filler is pulverized. Useful fillers have a specific surface area of 10 to 300 m$^2$/cm$^3$.

In one embodiment of the present invention, the NFP or some portion of the NFP is blended with a filler, desirably a porous filler. The NFP and filler may be blended by, for example, a tumbler or other wet blending apparatus, for a time suitable to form a homogenous composition of NFP and filler, desirably from 1 minute to 5 hours. In another embodiment, a filler may be pre-contacted or pre-absorbed with the NFP or some portion of the NFP prior to contacting the filler with the polyolefin. In another embodiment, the filler, polyolefin, and NFP are contacted simultaneously (or in the same blending apparatus).

Desirable fillers include but not limited to: mineral aggregates (natural or synthetic), fibers, carbon black, graphite, wollastonite, natural and synthetic clays including nanoclays and organoclays, sand, glass beads, and the like, and any other porous or nonporous fillers and supports known in the art. Preferred natural or synthetic mineral fillers include talc, mica, wollastonite, titanium dioxide, silicon carbide, silica, silicon dioxide and other oxides of silica (precipitated or not), calcium silicate, calcium and barium sulfates, calcium carbonate (calcite), lead carbonate, magnesium silicate, magnesium oxysulfates, antimony oxide, zinc white, lithopone, zircon, corundum, spinel, apatite, Barytes powder, magnesiter, dolomite, zinc borate, hydrotalcite compounds of the ions Mg, Ca, or Zn with Al, Cr or Fe and $CO_3$ and/or $HPO_4$ (hydrated or not), quartz powder, hydrochloric magnesium carbonate, alumina, chrome, phosphorous and brominated flame retardants, antimony trioxide, silicone, other metal oxides, other metal carbonates, other metal hydroxides, and blends thereof.

Useful non-halogenated flame retardants include those in the following table.

| Name | Description | Particle Size | Commercial Source |
|---|---|---|---|
| ADK Stabilizer FP-2100J | Nitrogen/phosphorous compound | | Amfine Chemical |
| Hymond 632SP | Vinyl silane treated Al(OH)$_3$ | 3.5 μm | Huber |
| Vertex 60HST | Fatty acid treated Mg(OH)$_2$ | 3.0 μm | Huber |
| Vertex 90ST1 | Fatty acid treated Mg(OH)$_2$ | 1.5 μm | Huber |
| SCPX-2970 | Calcium montmorillonite | | Southern Clay Products |

Preferred fibers include glass fibers (long or short), carbon fibers, and natural and synthetic polymer fibers including polyethylene terephthalate (PET) fibers and rayon fibers.

Preferred clays include nanoclays or organoclays to produce a nanocomposite. These clays may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. The organoclay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica. In another embodiment the filler is a nano-clay with mean particle diameter of less than 1 micron.

Additives

Additives such as antioxidants and stabilizers (including UV stabilizers and other UV absorbers, such as chain-breaking antioxidants), nucleating agents, slip agents, block, antiblock, pigments, dyes, color masterbatches, waxes, processing aids (including pine or coal tars or resins and asphalts), neutralizers (such as hydro talcite), adjuvants, oils, lubricants, low molecular weight resins, surfactants, acid scavengers, anticorrosion agents, cavitating agents, blowing agents, quenchers, antistatic agents, cure or cross linking agents or systems (such as elemental sulfur, organo-sulfur compounds, and organic peroxides), fire retardants, coupling agents (such as silane), and combinations thereof may also be present in the polyolefin compositions described herein. Typical additives used in polypropylene and polypropylene blends are described in POLYPROPYLENE HANDBOOK 2$^{nd}$ ED., N. Pasquini, ed. (Hanser Publishers, 2005). The additives may be present in the typically effective amounts well known in the art, preferably at 0.001 to 50 wt % (preferably 0.01 to 20 wt %, preferably 0.1 to 10 wt %, preferably 0.1 to 1 wt %), based upon the weight of the composition. Pigments, dyes, and other colorants may be present from 0.01 to 10 wt % (preferably 0.1 to 6 wt %).

Antioxidants and Stabilizers

Particularly useful antioxidants and stabilizers such as organic phosphites, hindered amines (including high and low molecular weight hindered amine light stabilizers, or "HALS"), and phenolic antioxidants may be present in the thermoplastic polyolefin compositions of the invention from 0.001 to 2 wt % (preferably from 0.01 to 0.8 wt %, preferably from 0.02 to 0.5 wt %). Non-limiting examples of organic phosphites that are suitable are tris(2,4-di-tert-butylphenyl) phosphite (IRGAFOS 168) and di(2,4-di-tert-butylphenyl) pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1, 1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl)propionate (IRGANOX 1010); and 1,3,5-Tri(3,5-di-tert-butyl-4-hydroxybenzyl-isocyanurate (IRGANOX 3114). Preferred antioxidants include phenolic antioxidants, such as Irganox 1010, Irganox, 1076 both available from Ciba-Geigy.

In another embodiment, the polymer concentrate may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate, and pentaerythrityl-tetrakis-[3-(3,5-di-t-butyl-4-hydroxyphenyl)]propionate.

Slip Agent

The polyolefin compositions of the present invention may include a slip agent. Preferably, the slip agent is preferably a fast bloom slip agent, and can be a hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate. In one embodiment the slip agent is an ionic compound. Ionic slip agents include salt derivatives of aromatic or aliphatic hydrocarbon oils, notably metal salts of fatty acids, including metal salts of carboxylic, sulfuric, and phosphoric aliphatic saturated or unsaturated acid having a chain length of 7 to 26 carbon atoms, preferably 10 to 22 carbon atoms. Suitable fatty acids include the monocarboxylic acids lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, and the like, and the corresponding sulfuric and phosphoric acids. Suitable metals include Li, Na, Mg, Ca, Sr, Ba, Zn, Cd, Al, Sn, Pb, and so forth. Suitable salts include magnesium stearate, calcium stearate, sodium stearate, zinc stearate, calcium oleate, zinc oleate, magnesium oleate, and so on, as well as the corresponding metal higher alkyl sulfates and metal esters of higher alkyl phosphoric acids.

In another embodiment, fatty acid metal salts are substantially absent from the polyolefin compositions of the present invention.

In another embodiment the slip agent is as described at paragraphs [0394] to [00400] on pages 23-24 of WO 2008/0045638.

Generally preferred concentrations of the slip agent are in the range of from about 0.001% to about 0.5% by weight of the composition, preferably of from about 0.01% to about 0.4% by weight and most preferably of from about 0.1 parts to about 0.3% by weight based on the weight of the composition.

Nucleating Agent

The composition described herein may also include the addition of at least one nucleating agent. Typically, nucleating agents increase the rate of crystallization (isothermal and/or non-isothermal) of the polyolefin. A special class of nucleating agents known as clarifying agents typically reduces the size of crystallites, thereby improving the transparency and clarity of articles made from the polyolefin.

Suitable nucleating agents for use herein are disclosed in *Plastics Additive Handbook*, 5$^{th}$ Ed.; a H. Zweifel, Ed.; Hanser-Gardner Publications, (2001); Chapter 18, pp. 949-972. Suitable nucleating agents for use herein are also disclosed by H. N. Beck in *Heterogeneous Nucleating Agents for Polypropylene Crystallization*, J. APPLIED POLY. SCI. Vol. 11, pp. 673-685 (1967) and in *Heterogeneous Nucleation Studies on Polypropylene*, J. POLY. SCI.: POLY. LETTERS, Vol. 21, pp. 347-351 (1983). Useful nucleating agents can be either homogeneous nucleating agents (i.e., melt-soluble, meaning dissolved into the polyolefin) or heterogeneous nucleating agents (i.e., melt-insoluble, meaning suspended or dispersed in the polyolefin). Typical nucleating agents promote at least one crystal polymorph for the polyolefin. For example, when the polyolefin is isotactic polypropylene (iPP), known crystal forms include the so-called alpha, beta, and gamma polymorphs; useful nucleating agents therefore include those that promote alpha crystals in iPP, those that promote beta crystals in iPP, and those that promote gamma crystals in iPP. Suitable nucleating agents also include those that promote crystallization in syndiotactic polypropylene (sPP).

Suitable nucleating agents are described in paragraphs [0401] to [0423] on pages 24-25 of WO 2008/0045638. Specific examples of suitable nucleating agents are sodium benzoate and sodium naphthenoate, sodium 2,2'-methylenebis(4,6-di-tert-butylphenyl) phosphate, aluminum 2,2'-methylenebis(4,6-di-tert-butylphenyl)phosphate, di(p-tolylidene)sorbitol, dibenzylidene sorbitol, di(p-methylbenzylidene)sorbitol, di(p-ethylbenzylidene)sorbitol, bis(3,4-dimethylbenzylidene)sorbitol, and N',N'-dicyclohexyl-2,6-naphthalenedicarboxamide. Other suitable nucleating agents are disclosed in U.S. Pat. No. 4,016,118; U.S. Pat. No. 4,371,645; U.S. Pat. No. 5,049,605; U.S. Pat. No. 6,235,823; US 2004/0132884; WO 02/046300; WO 03/102069; and EP 776933. The nucleating agent(s) are typically present in the composition of this invention at 0.01 to 1 wt % (100 to 10,000 ppm), preferably 0.02 to 0.5 wt % (200 to 5,000 ppm), preferably 0.03 to 0.3 wt % (300 to 3,000 ppm), preferably 0.05 to 0.25 wt % (500 to 2,500 ppm), based upon the weight of the composition (where ppm is parts-per-million by weight).

Crosslinking Agents

In another embodiment, the polyolefin composition may further comprise a crosslinking agent. Preferred crosslinking agents include those having functional groups that can react with functional groups present on the polyolefin, including alcohols, multiols, amines, diamines and/or triamines. Particular examples of crosslinking agents useful in this invention include polyamines such as ethylene-diamine, diethylene-triamine, hexamethylene-diamine, diethylaminopropyl-amine, and menthane-diamine.

Oils

In some embodiments, conventional mineral oils may be present in the composition of this invention, such as paraffinic or naphthenic mineral oils, white oils, technical white oils, bright stocks, Group I or Group II basestocks, vegetable oils, or the like. In other embodiments, functionalized oils other than amide slip agents are substantially absent from the polyolefin composition. In preferred embodiments, naphthenic and aromatic mineral oils are substantially absent from the compositions of the present invention, alternately they are preferably present at 0 wt %. In another embodiment, aromatic moieties and carbon-carbon unsaturation are substantially absent from the non-functionalized plasticizers used in the present invention. Aromatic moieties include a compound whose molecules have the ring structure characteristic of benzene, naphthalene, phenanthrene, anthracene, etc.

Tackifiers

In another embodiment, tackifiers may be blended with the polyolefin composition of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the polar groups are substantially absent from the tackifier, or preferably polar groups are not present.) In some embodiments the tackifier has a softening point (Ring and Ball, ASTM E 28) of 80 to 140° C., preferably 100 to 130° C. Tackifiers, if present, are typically present at about 1 to about 50 wt % (preferably 2 to 40 wt %, preferably 5 to 20 wt %), based upon the weight of the composition. Preferably however, tackifier is not present, or is present at less than 10 wt % (preferably less than 5 wt %, preferably at less than 1 wt %).

Conventional Plasticizers

In one embodiment of compositions of the present invention, conventional plasticizers such as are commonly used for poly(vinyl chloride) are substantially absent, preferably present at 0 wt %. In particular, plasticizers such as phthalates, adipates, trimellitate esters, polyesters, and other functionalized plasticizers as disclosed in, for example, U.S. Pat. Nos. 3,318,835; 4,409,345; WO 02/31044 A1; and PLASTICS ADDITIVES, pp. 499-504 (Geoffrey Pritchard, ed., Chapman & Hall 1998), are substantially absent.

Waxes

Preferred waxes suitable for use in the compositions of this invention include: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ear wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition. In a preferred embodiment, compositions of this invention comprise no waxes.

Preparing the Polyolefin Composition

The ethylene plastomers, propylene based TPO's, NFP(s), optional filler(s), and optional additives components of the polyolefin composition of the present invention can be combined using any suitable means known in the polymer processing art. Those skilled in the art will be able to determine the appropriate procedure to balance the need for intimate mixing with the desire for process economy. For example, one or more polyolefin component can be in the form of pellets or reactor granules, which are combined with the NFP(s), optional filler(s), and optional additives by simple physical blending of constituent pellets and/or granules, since the forming of articles includes a (re)melting and mixing of the raw material(s). However, in some fabrication processes such as compression molding, little mixing of the raw material(s) occurs, and a pelletized melt blend would be preferred over simple physical blends of the constituent pellets and/or granules. In this case, the constituents are melt blended first, to provide a compounded product.

The ethylene plastomer and propylene based TPO components may be in any physical form when blended with the NFP(s), optional filler(s), and optional additives. For example, they may be in the form of reactor granules (i.e., granules of polymer that are isolated from the polymerization reactor prior to any processing procedures), which typically have an average diameter of 50 µm to 5 mm, or in the form of pellets that are formed from melt extrusion of the reactor granules, which typically have an average diameter of 1 to 10 mm.

The components can be blended by any suitable means. For example, they may be blended in a tumbler, static mixer, batch mixer, extruder, or a combination thereof that is sufficient to achieve an adequate dispersion of the components. More particularly, the components may be blended by any suitable means to form the polyolefin composition of the present invention, which is then suitable for further processing into useful articles.

Preferably, the composition is prepared by combining the components in a melt-blending (compounding) step and subsequently pelletizing the blend, using either an underwater pelletizer or a strand-cut approach (i.e., a water batch and dry pelletizer); these pellets are then used in a process to fabricate articles. This approach may involve an on-line "finishing" extruder associated with a polymerization unit, or it may involve an off-line "compounding" extruder dedicated to melt blending. Alternatively, the composition may be prepared by combining the components during a process used to fabricate articles, without first making a pelletized version of the composition; here, NFP is added to other components in a production extruder, such as the extruder on an injection molding machine or on a continuous extrusion line, and thereafter directly processed into a film, sheet, fiber, profile, etc. In either case, production rates may be between 5 and 3000 kg/hr.

The blending may involve "dry blending" wherein the polyolefin(s) are combined with the NFP(s) without melting. For example, one method is to contact the components in a tumbler or bowl mixer, such as a high-speed Henschel mixer. The polyolefin(s) are preferably in the form of reactor granules (this works particularly well with ICPs and propylene polymers), but dry blending can also involve pellets. The dry blending step can then be followed, if desired, by melt blending in an extruder.

Another method of blending the components is to melt blend the polyolefin(s), either in pellet or granule form, with the NFP(s) and optionally with the filler(s) and/or additives in a batch mixer, such as a Banbury mixer.

Another method of blending the components is to melt blend the polyolefin(s), either in pellet or granule form, with the NFP(s) and optionally the filler(s) and/or additives in an extruder, such as a single-screw extruder or a twin-screw extruder. Extrusion technology for polyolefins and polyolefin blends is well known in the art, and is described in more detail in, for example, PLASTICS EXTRUSION TECHNOLOGY, F. Hensen, Ed. (Hanser, 1988), pp. 26-37 and in POLYPROPYLENE HANDBOOK, E. P. Moore, Jr. Ed., (Hanser, 1996), pp. 304-348. Extruder melt mixing is a preferred method of blending when a high NFP loading is desired, or when large quantities of the polyolefin composition are desired. Typical extruder characteristics associated with blending NFP into polyolefin(s) include: an operating temperature profile within the range of 120 to 280° C. (usually 160 to 240° C.); a melt temperature at least 10-50° C. above $T_m$ of the polyolefin having the highest $T_m$ (usually 140 to 220° C.); an operating speed of 50 to 1200 rpm; and a specific energy input of 0.01 to 100 kWh/kg. The extruder may be set up with or without screen pack(s) for filtration, and with or without a melt gear pump.

NFP may be directly injected into the polymer melt using a liquid injection device at some point along the barrel, as in the case of a twin-screw extruder, or through an opening in a hollow screw shaft, as in the case of a single-screw extruder. NFP is preferably added downstream from the polymer melt zone, but alternatively the NFP can be added at a point where the polymer(s) have not fully melted yet. For example, in a twin-screw extruder, NFP can be injected after the first barrel section (preferably after the first third of the barrel, more preferably in the last third of the barrel). Preferably, NFP is added downstream of filler addition. An NFP addition point may be on top of conveying elements of screw, or on top of liquid mixing elements of screw, or prior to kneading elements of screw, or prior to liquid mixing elements of the screw. The extruder may have more than one (preferably two or three) NFP addition points along the barrel or screw shaft. Optionally, the NFP can be added via the extruder fed throat.

Addition of NFP is preferably by controlled metering; e.g., using a loss-in-weight feeder or a calibrated flow-rate meter. Preferably NFP delivery is via a pump (such as a piston, gear, or diaphragm pump) capable of generating a delivery pressure of at least 5 bar (preferably at least 10 bar, preferably at least 20 bar, preferably at least 30 bar, preferably at least 40 bar). (1 bar=100 kPa).

Preferably, the extruder is a twin-screw extruder with a length to diameter ratio, L/D, of 20-80 (preferably 30-60, preferably 25-50, preferably 35-45) and/or a screw diameter of 20 to 200 mm. Preferably the screw design contains liquid mixing elements (gear-type elements) that create high surface renewal of the polymer, which promotes homogenization at high fluid concentrations. Such extruders are know in the art and are manufactured by Coperion Werner-Pfleiderer, Berstorff, Leistriz, and others.

The components may also be blended by a combination of methods, such as dry blending followed by melt blending in an extruder, or batch mixing of some components followed by melt blending with other components in an extruder. One or more components may also be blended using a double-cone blender, ribbon blender, or other suitable blender, or in a Farrel Continuous Mixer (FCM).

Blending may also involve a "masterbatch" approach, where the target NFP concentration is achieved by combining neat polyolefin(s) and optionally filler and/or additives with an appropriate amount of pre-blended masterbatch (i.e., a blend of polymer, NFP, and optionally filler and additives that has been previously prepared at a higher concentration of NFP than desired in the final blend). This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

The components may be blended in solution by any suitable means to form the polyolefin composition, by using one or more solvents that dissolve the polyolefin and NFP components to a significant extent. The blending may occur at any temperature or pressure where the NFP and the polyolefin remain in solution. Preferred conditions include blending at high temperatures, such as 20° C. or more above the melting point of the polymer. For example, iPP would typically be solution blended with the NFP at a temperature of 200° C. or more. Such solution blending would be particularly useful in processes where the polymer is made by a solution process and the NFP is added directly to the finishing train, rather than added to the dry polymer in another blending step altogether. It would also be particularly useful in processes where the polymer is made in a bulk or high pressure process where the polymer and the NFP were soluble in the monomer, where the NFP may be added directly to the finishing train. Similarly, a filler could be added to the finishing train.

Calendering and Roll Milling

Calendering is a continuous forming process utilizing successive pairs of counter-rotating rolls that form a mass of molten plastic or rubber into a sheet of uniform thickness. Roll milling is a process utilizing at least two rollers to mix and or prepare a material for calendering. Conventional calendering processes and equipment may be used to calender the blend compositions described herein. In the process of the invention, the blend composition may comprise a molten, pellet, or powder form and is passed through a compressive nip between at least two calendering rolls at temperatures of from about 80° C. to about 220° C. (preferably about 100° C. to about 200° C., preferably about 130° C. to about 180° C., preferably about 140° C. to about 160° C.). Typically, the polymers components (ICP, Plastomer, etc) are blended with the NFP, optional fillers and additives (such as flame retardants, slip agents) and other components before calendering. The mixed ingredients are typically combined in a kneader or extruder. Through heat, shearing, and/or pressure, the dry powders and/or liquids are combined to form a molten material. The extruder or kneader then typically feeds the molten material in a continuous process to the top of the mill rollers or the calendering section of the calendering line in between first and second heated mill or calender rolls. Typically, four rolls are used to form three nips or gaps. For example, the rolls may be configured in an "L" shape, an inverted "L" shape," or a "Z" configuration. The rolls may vary in size to accommodate different film/sheet widths. The rolls typically have separate temperature and speed controls and different friction ratios. (The ratio of roll speeds is termed the "friction ratio".) The material proceeds through the gap between the first two rolls, referred to as the feed nip. (Rolls are numbered from the first feed nip to the last at take off.) The rolls typically rotate in opposite directions (and often at different speeds) to help spread the material across the width of the rolls. The material winds between the first and second, second and third, third and fourth rolls, etc. The gap between rolls decreases in thickness between each of the rolls such that the material is thinned between the sets of rolls as it proceeds. The resulting film or sheet, therefore, has a uniform thickness that is produced by passing the blend composition through the compressive nips between the heated rolls. In effect, the blend composition is squeezed between the nips which separate the rolls. Each successive nip between the calendering rolls reduces the film/sheet thickness until the final film or sheet gauge is obtained. Typical processing temperatures for the rolls will generally range from about 80° C. to about 220° C. (preferably about 100° C. to about 200° C., preferably about 130° C. to about 180° C., preferably about 140° C. to about 160° C.) and/or back roll speed of about 10 rpm to about 100 rpm (preferably about 20 rpm to about 80 rpm, preferably about 30 rpm to about 60 rpm) and friction ratio of from 1.0 to about 2.0 (preferably about 1.1 to about 1.8, preferably about 1.2 to about 1.6). For some hydrolytically unstable blends, predrying the composition or venting excess moisture during processing is desirable to prevent polymer degradation by hydrolysis. After passing through the calender section, the material moves through another series of rolls where it is stretched and gradually cooled forming a film or sheet. The material also may be embossed, annealed or otherwise treated before cooling. The cooled material is then wound onto master rolls. An air knife may be additionally installed to assist in the production of the films and sheets. Furthermore, an in-line corona treating may be added which provides for high dyne level films and sheets. General descriptions of calendering processes are disclosed in Jim Butschli, *Packaging World*, p. 26-28, June 1997 and W. V. Titow, *PVC Technology*, 4th Edition, pp 803-848 (1984), Elsevier Publishing Co.

In some embodiments using asymmetrical milling, the mixing is not quite sufficient due to the closed streamlines around the roll and lack of material transport/exchange along the length of the nip. Therefore, a mill operator typically constantly disturbs these conditions by cutting (for example ¾-cuts from each side of the film/sheet), pulling the banded polymeric film/sheet away from the roll, followed by cross-blending (folding the film/sheet back to itself) and/or end-wise feeding (passing the rolled stock or batch end-wise through the mill). For this reason, the film/sheet should not stick strongly to the roll because it is difficult to pull it away from the roll. On the other hand, insufficient melt strength in the blend composition may lead to the molten material easily breaking upon pulling.

The use of this kneading and calendering process enables polypropylene based compositions to be calendered in conventional PVC film calendering lines at commercially acceptable production rates.

In a preferred embodiment, the roll temperature in the calender roll is about 80° C. to about 220° C., preferably about 100° C. to about 200° C., preferably about 120 to about 180° C., preferably about 140° C. to about 160° C.).

In a preferred embodiment, the roll radius in the calender roll is about 0.5" (1.27 cm) to about 10" (25.4 cm), preferably about 1" (2.54 cm) to about 8" (20.3 cm), preferably about 1.5" (3.81 cm) to about 4" (10.2 cm).

In a preferred embodiment, the nip distance between the first and second rolls in the calender roll is about 1 mil (25.4 micron) to about 50 mils (1270 micron), preferably about 5 mils (127 micron) to about 40 mils (1016 micron), preferably about 10 mils (254 micron) to about 30 mils (762 microns).

In a preferred embodiment, the friction ration between the first and second rolls in the calender roll is about 1.0 to about 2.0, preferably about 1.1 to about 1.8, preferably about 1.2 to about 1.6.

In another embodiment, the blend compositions from this invention may be processed in the calendering methods disclosed in U.S. Pat. Nos. 5,439,628; 5,820,970; and 7,235,623.

Applications

The films and sheets produced herein may be used as automobile seat covers, flexible labels, fabric (such as for a table cloth, or hand bag) shoe material, roof sheeting, protective film, and the like.

In alternate embodiments, this invention relates to:
1. A film or sheet having a thickness of from 0.5 to 35 mils (12.7 to 889 microns) comprising a blend composition comprising:
a) 4 to 50 wt % (preferably 5 to 40 wt %, preferably 6 to 20 wt %), based upon the weight of the composition, of a polypropylene-based TPO (preferably an ICP) comprising at least 50 wt % propylene and at least 10 wt % ethylene, having an MFR of 10 dg/min or less (preferably 5 dg/min or less, preferably 1.5 dg/min or less, preferably 1 dg/min or less) a melting point, Tm, of 150° C. or more (preferably 155° C. or more, preferably 160° C. or more), and a lowest Tg of −30° C. or less (preferably −40° C. or less, preferably −50° C. or less); and
b) 30 to 80 wt % (preferably 40 to 70 wt %), based upon the weight of the composition, of an ethylene plastomer having a melt index of 3 dg/min or less (preferably 2 dg/min or less, preferably 1 dg/min or less, preferably 0.5 dg/min or less) and a density of 0.860 to 0.91 g/cc (preferably 0.862 to 0.890 g/cc, preferably 0.862 to 0.87 g/cc); and
c) 0.25 to 35 wt % (preferably 1 to 30 wt %, preferably 2 to 20 wt % preferably 5 to 15 wt %), based upon the weight of the composition, of one or more non-functionalized plasticizer(s) having a kinematic viscosity at 100° C. of 4 to 300 cSt (preferably 5 to 100 cSt, preferably 8 to 20 cSt), a pour point of −20° C. or less (preferably −25° C. or less, preferably −30° C. or less, preferably −40° C. or less), a flash point of 200° C. or more (preferably 220° C. or more, preferably 240° C. or more, preferably 260° C. or more), (preferably the NFP also has a viscosity index of 100 or more (preferably 110 or more, preferably 120 or more, preferably 130 or more), and or a specific gravity of 0.88 or less (preferably 0.87 or less, preferably 0.86 or less); and
d) 0 to 69.5 wt % (preferably 0.2 to 50 wt %, preferably 0.5 to 40 wt %, preferably 1 to 30 wt %, preferably 5 to 20 wt %), based upon the weight of the composition, of one or more filler(s), preferably flame retardant filler; and
said blend composition having:
i) a tensile strength (Machine Direction) of 7 MPa or more (preferably 8 MPa or more, preferably 9 MPa or more, preferably 10 MPa or more); and
ii) an elongation at break (Transverse and/or Machine Direction) of 400% or more (preferably 500% or more, preferably 700% or more, preferably 900% or more); and
iii) a flexural modulus of 50 MPa or less (preferably 30 MPa or less, preferably from 3 to 40 MPa, preferably from 5 to 30 MPa); and
iv) a Vicat softening temperature of 50° C. or more, preferably 55° C. or more, preferably 58° C. or more; and
v) a highest Tm of 145° C. or more, preferably 150° C. or more, preferably 155° C. or more; and
vi) a Roll Change Point of 5 to less than 29 mils (127 to 737 microns), preferably of 10 to 25 mils (254 to 635 microns), preferably 15 to 22 mils (381 to 559 microns); and
wherein the blend composition is calendered into a film or sheet having a thickness of 0.5 to 35 mils (12.7 to 889 microns), preferably 2 to 30 mils (51 to 762 microns), preferably 10 to 30 mils (254 to 762 microns), preferably 20 to 30 mils (508 to 762 microns), preferably 20 to 25 mils (508 to 635 microns).
2. The film or sheet of paragraph 1, wherein the blend composition has two melting points as measured by DSC (the first being at least 145° C. and the second being at least 40° C., where the two Tm's are at least 20° C. apart.
3. The film or sheet of paragraph 1 or 2, wherein the blend composition has a Tear Strength of 45 kg/cm or more, preferably 50 kg/cm or more, preferably 55 kg/cm or more.
4. The film or sheet of paragraph 1, 2, or 3, wherein the blend composition has an equal or better scratch resistance rating as compared the same blend composition without NFP (i.e., where the ratio of the remaining component weight fractions is the unchanged).
5. The film or sheet of paragraph 1, 2, 3, or 4, wherein the blend composition has a scratch resistance rating of 3 N or more (preferably 5 N or more, preferably 7 N or more, preferably 10 N or more, preferably 12 N or more).
6. The film or sheet of any of paragraphs 1 to 5, wherein the filler is an inorganic mineral filler with a median particle diameter of 0.1 to 100 microns and or an aspect ratio of greater than 1.2.
7. The film or sheet of any of paragraphs 1 to 6, wherein the filler is selected from the group consisting of mineral aggregates (natural or synthetic), fibers, carbon black, graphite, wollastonite, natural and synthetic clays (including nanoclays and organoclays), sand, and glass beads.

8. The film or sheet of any of paragraphs 1 to 7, wherein the polypropylene-based TPO comprises a matrix having a melting point ($T_m$) of 110° C. or more (preferably 120° C. or more, preferably 125° C. or more, preferably 130° C. or more, preferably 140° C. or more, preferably 150° C. or more, preferably 160° C. or more) and a dispersed phase having a glass transition temperature ($T_g$) of −20° C. or less (preferably −25° C. or less, preferably −30° C. or less, preferably −35° C. or less, preferably −40° C. or less, preferably −45° C. or less, preferably −50° C. or less, preferably −55° C. or less).

9. The film or sheet of any of paragraphs 1 to 8, wherein the propylene based TPO is one or more ICP(s), preferably at least one of the ICP(s) is an in-situ ICP; more preferably all the ICP(s) are in-situ ICP(s).

10. The film or sheet of any of paragraphs 1 to 9, wherein the ethylene plastomer has an ethylene content of 60 to 90 wt % (preferably 65 to 85 wt %, preferably 65 to 80 wt %, preferably 65 to 75 wt %), alternately the ethylene plastomer has an ethylene content of 80 to 96 mol % (preferably 82 to 92 mol %, preferably 82 to 88 mol %); and, optionally a propylene content of 10 to 20 wt %; and/or optionally, a butene-1 content of 15 wt % or more (preferably 20 wt % or more, preferably 25 wt % or more); and/or optionally a hexene-1 content of 20 wt % or more (preferably 25 wt % or more, preferably 30 wt % or more); and/or optionally anoctene-1 content of 25 wt % or more (preferably 30 wt % or more, preferably 35 wt % or more).

11. The film or sheet of any of paragraphs 1 to 10, wherein the ethylene plastomer has a density of 0.91 to 0.86 g/cm³ (preferably 0.86 to 0.90 g/cm³, preferably 0.86 to 0.89 g/cm³, preferably 0.86 to 0.88 g/cm³, preferably 0.86 to 0.87 g/cm³).

12. The film or sheet of any of paragraphs 1 to 11, wherein the NFP is a polyalphaolefin.

13. The film or sheet of any of paragraphs 1 to 11, wherein the NFP is a mixture of $C_{20}$ to $C_{120}$ paraffins, 50 wt % or more being isoparaffinic hydrocarbons and less than 50 wt % being hydrocarbons that contain naphthenic and/or aromatic structures.

14. A process to produce the film or sheet of any of paragraphs 1 to 13, comprising: 1) combining 4 to 50 wt %, based upon the weight of the composition, of the polypropylene-based TPO described above, 30 to 80 wt %, based upon the weight of the composition, of the ethylene plastomer described above, 0.25 to 35 wt %, based upon the weight of the composition, of one or more non-functionalized plasticizer(s) described above, and 0 to 69.5 wt %, based upon the weight of the composition, of one or more filler(s) described above to form a blend; 2) calendering the blend between at least two calendering rolls at a temperature of 80° C. to 220° C. having a nip distance of 1 to about 50 mils (25.4 to 1270 microns) where the blend has:

i) a tensile strength (Machine Direction) of 7 MPa or more (preferably 8 MPa or more, preferably 9 MPa or more, preferably 10 MPa or more); and ii) an elongation at break (Transverse and/or Machine Direction) of 400% or more (preferably 500% or more, preferably 700% or more, preferably 900% or more); and iii) a flexural modulus of 50 MPa or less (preferably 30 MPa or less, preferably from 3 to 40 MPa, preferably from 5 to 30 MPa); and iv) a Vicat softening temperature of 50° C. or more, preferably 55° C. or more, preferably 58° C. or more; and v) a highest Tm of 145° C. or more, preferably 150° C. or more, preferably 155° C. or more; and vi) a Roll Change Point of 5 to less than 29 mils (127 to 737 microns), preferably of 10 to 25 mils (254 to 635 microns), preferably 15 to 22 mils (381 to 559 microns); and wherein the blend composition is calendered into a film or sheet having a thickness of 0.5 to 35 mils (12.7 to 889 microns), preferably 2 to 30 mils (51 to 762 microns), preferably 10 to 30 mils (254 to 762 microns), preferably 20 to 30 mils (508 to 762 microns), preferably 20 to 25 mils (508 to 635 microns).

15. The process of paragraph 14 wherein the friction ration between the first and second rolls in the calender is about 1.0 to about 2.0.

Experimental Methods

Unless otherwise noted, physical and chemical properties described herein are measured using the following test methods:

| Polyolefin Test Methods | |
|---|---|
| Melt Index (MI) | ASTM D 1238 (190° C./2.16 kg) |
| Melt Flow Rate (MFR) | ASTM D 1238 (230° C./2.16 kg) |
| Mooney Viscosity | ASTM D 1646 |
| Density | ASTM D 1505 |
| Intrinsic Viscosity | ASTM D 1601 (135° C. in decalin) |
| Injection Molding | ASTM D 4101 |
| Test Specimen Conditioning | ASTM D 618, Procedure A |
| Tensile Properties (e.g., Young's modulus, yield stress & strain, break stress & strain) | ASTM D 638 (Type I bar, 5 cm/min) |
| 1% Secant Flexural Modulus | ASTM D 790 (A, 1.3 mm/min) |
| Heat Deflection Temperature | ASTM D 648 (0.45 MPa) |
| Vicat Softening Temperature | ASTM D 648 (200 g) |
| Gardner Impact Strength | ASTM D 5420 (GC) |
| Notched Izod Impact Strength | ASTM D 256 (Method A, or Method E if "reverse notch" noted) |
| Notched Charpy Impact Strength | ASTM D 6110 |
| Multi-Axial Impact Strength | ASTM D 3763 (15 MPH) |
| Shore (Durometer) Hardness | ASTM D 2240 (A 15 sec delay) |
| Shrinkage upon injection molding | ISO 2577 |

| Fluid (NFP) Test Methods | |
|---|---|
| Kinematic Viscosity (KV) | ASTM D 445 (at temp noted) |
| Viscosity Index (VI) | ASTM D 2270 |
| Pour Point | ASTM D 97 |
| Specific Gravity and Density | ASTM D 4052 (15.6/15.6° C.) |
| Flash Point | ASTM D 92 |
| Glass Transition Temperature ($T_g$) | ASTM D 1356 |
| Boiling/Distillation Range | ASTM D 1160 |
| Saturates Content | ASTM D 2007 |
| Sulfur Content | ASTM D 2622 |
| Nitrogen Content | ASTM D 4629 |
| Bromine Number | ASTM D 1159 (or ASTM D 2710 if so directed by ASTM D 1159) |
| Aniline Point | ASTM D 611 |
| Color | ASTM D 1209 |

| Composition Test Methods | |
|---|---|
| Ethylene content of EP Rubbers | ASTM D 3900 |
| Filler content | ISO 3451-1 (A) |

The glass transition temperature ($T_g$) of a polymer is determined using dynamic mechanical analysis as described at page 36, paragraph [0596] of US 2008/0045638.

Crystallization temperature ($T_c$) and melting temperature (or melting point, $T_m$), heat of fusion (Hf) and % crystallinity are determined using Differential Scanning calorimetry (DSC) as described at page 36-37, paragraphs [0597]-[0599] of US 2008/0045638, specifically according to ASTM D 3418 using a TA Instruments Model 2920 DSC.

Weight-average molecular weight, $M_w$, number-average molecular weight, $M_n$, molecular weight distribution, $M_w/M_n$ or MWD, and branching index, g' of the polyolefins (except the Kraton G) are determined using Size Exclusion Chromatography as described at page 37-38, paragraphs [0600]-[0611] of US 2008/0045638, except that the temperature was 150° C. and the polymer concentration was 3 to 4 mg/ml. A Waters GPC using tetrahydrofuran as the permeation solvent equipped with UV and DRI detectors was used to determine the molecular weights of Kraton G 1650 and the composition of the block copolymer (expressed as wt % styrene endblock) was obtained by $^1$H NMR using a Varian XL 400 with deuterated chloroform as the solvent.

Composition Distribution Breadth Index is a measure of the composition distribution of monomer within the polymer chains. It is measured as described in WO 93/03093, with the modification that any fractions having a weight-average molecular weight ($M_w$) below 20 kg/mol are ignored in the calculation.

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]) as described at page 38, paragraphs [0613]-[0616] of US 2008/0045638 (including the references to F. A. Bovey in POLYMER CONFORMATION AND CONFIGURATION (Academic Press, New York 1969), J. Randall in POLYMER SEQUENCE DETERMINATION, $^{13}$C-NMR METHOD (Academic Press, New York, 1977, H. N. Cheng, *Macromolecules*, 17, 1950 (1984), U.S. Pat. No. 5,504,172 (homopolymer: column 25, line 49 to column 27, line 26; copolymer: column 28, line 38 to column 29, line 67), J. A. Ewen, CATALYTIC POLYMERIZATION OF OLEFINS: PROCEEDINGS OF THE INTERNATIONAL SYMPOSIUM ON FUTURE ASPECTS OF OLEFIN POLYMERIZATION, T. Keii and K. Soga, Eds. (Elsevier, 1986), pp. 271-292; and 2) US 2004/054086 (paragraphs [0043] to [0054]) as cited therein.

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, pp. 2651 (2004) for higher olefin comonomers.

The number-average molecular weight ($M_n$) for the liquid NFP's is determined by one of two methods:
1. for samples having a kinematic viscosity at 100° C. of 10 cSt or less use Gas Chromatography (GC) with a mass spectrometer detector, as generally described in MODERN PRACTICE OF GAS CHROMATOGRAPHY, 3RD ED., R. L. Grob and E. F. Barry (Wiley-Interscience, 1995); or
2. for samples having a kinematic viscosity at 100° C. of more than 10 cSt use Gel Permeation Chromatography (GPC), as generally described in MODERN SIZE EXCLUSION LIQUID CHROMATOGRAPHS, W. W. Yan, J. J. Kirkland, and D. D. Bly, (J. Wiley & Sons, 1979), calibrated using polystyrene standards.

Carbon type composition ($C_A$, $C_N$, $C_P$) is determined by ASTM D 2140 as described at page 38-39, paragraphs [0620] of US 2008/0045638.

Fluid Color is determined on the APHA scale by ASTM D 1209.

The composition and branching characteristics of paraffinic hydrocarbon fluids is determined by $^{13}$C-NMR spectroscopy, following the general procedures and peak assignments outlined in Breitmaier and Voelter, CARBON-13 NMR SPECTROSCOPY, 3$^{rd}$ ED. (VCH, 1986).

The method to determine the NFP content (weight percent basis) in a polyolefin composition is the Extraction Method. Alternatively, the NMR Method can be used. In event of conflict, the Extraction Method shall control. These methods are described at page 39-40, paragraphs [0623]-[0630] of US 2008/0045638.

Permanence of the NFP is determined by ASTM D 1203, by measuring the weight loss from the plasticized composition in the form of a 0.25 mm thick sheet, after 300 hours in dry 70° C. oven. Permanence is 100% minus the Corrected % weight loss, where Corrected % weight loss=(% weight loss for the plasticized composition)−(% weight loss for the unplasticized composition under the same test conditions), % weight loss=100×(W−Wo)/Wo, W=weight after drying and Wo is the weight before drying. The unplasticized composition is the same composition as the plasticized composition but without NFP added.

Atomic Force Microscopy (AFM) is used to determine if a polyolefin blend is a hetero-phase blend as described at page 40, paragraphs [0632]-[0634] of US 2008/0045638, except that the specimen from each molded pad was prepared by cryofacing in a Reichert cryogenic microtome at −150° C. using a diamond knife. It was examined by AFM in air using a NanoScope Dimension 3000 Scanning probe microscope (Digital Instrument) equipped with a rectangular 225-μm Si cantilever.

The tendency for a polyolefin material to exhibit flow marks (or "tiger striping") is evaluated by the method described at page 40, paragraph [0635] of US 2008/0045638.

The tendency for a polyolefin material to resist visible damage when scratched (scratch resistance) is evaluated using the method described at page 40, paragraph [0636] of US 2008/0045638.

Rubber content in an in-situ ICP is determined by xylenes extraction at room temperature (23° C.). The xylenes soluble fraction is the amount of rubber in the in-situ ICP.

Diene content in an EP rubber is determined using FTIR, however if the diene is ENB or DCPD, ASTM D 6047-99 is used. Ethylene content in EPDM is determined using ASTM D 3900-05a.)

Tear strength is determined according to ASTM 1922.

Flammability is determined by FMVSS (Federal Motor Vehicle Standard Safety) 302, and was conducted by Intertek (Grand Rapids, Mich.) inside a chamber where the test specimen was mounted horizontally by supports consisting of thin, heat-resistant wires. Dimensions of the test specimen used by Intertek were about 4"×14"×80 mils. The exposed side of the test specimen was subjected to a gas flame by a Bunsen burner from underneath. The burnt distance and the time taken to burn this distance were measured. The burning rate was expressed in mm/min.

Molding

The blends recovered from the Brabender (see below) were compression-molded into sheets of thickness ~2 mm and area ~10×10 cm² between Teflon-coated aluminum foil by using a heated hydraulic press at a temperature of 190° C., a molding time of 15 min, and a press force of 10,000 lb (4536 Kg). The molded plaque was discharged from the press and cut into specimens for stress-strain tests and AFM measurements. The blends were also compression-molded into sheets of thickness ~3 mm and area ~15×15 cm². The sheets were then die-cut into specimens for flexural properties, hardness, and Vicat softening point measurements.

Stress-strain measurements were made using a Micro-dumbbell specimens (the base is ~1 cm×1 cm and the center, narrow strip is ~0.6 cm×0.2 cm) were cut from the molded plaques (thickness=2 mm) and stress-strain measurements under tension were performed in an Instron tester. Measurements using triplicate samples (conditioned under ambient conditions for 24 hr prior to tests) were performed at room temperature and at a separation speed of 5 cm/min. The stress was calculated based on the un-deformed cross-sectional area of the test specimen. Strain measurements were based on clamp separation. The tensile toughness was measured as the total area under the stress-strain curve.

Flexure properties at room temperature were determined according to ASTM D 790A. A bar of rectangular cross section rested on 2 supports (2"-span) and loaded by means of a loading nose midway between the supports at a speed of 0.05"/min. The 1% secant modulus, which is the ratio of stress to the corresponding strain (1%) on the stress-strain curve, was reported.

Vicat softening temperature was determined under 200 gram load according to ASTM D 648. It was tested using a CEAST HDT 300 VICAT. A needle of 1-mm$^2$ area was applied with a force of 200 g to the specimen surface submerged in the heat transfer fluid, Dow 220, while the temperature was raised at a heating rate of 120° C./hr. The temperature at which the needle penetrated 1-mm into the sample was reported as the Vicat softening point.

Melt strength was measured by heating the sample to 150° C. and forcing it through the capillary rheometer in a Göttfert Rheotens equipped with a damping mechanism to reduce oscillations. The extruded filament (strand length=12.5 cm), cooled by exposure to ambient air, was drawn down by means of a pair of motor-driven rollers. The tensile force in the filament was determined by measuring the vertical force on the rotating rollers. The test involved increasing the wind-up speed and noting the force level when the filament broke. This was reported as the melt strength.

Examples

Materials: VM6102, PP3155, PP1024E1, PP5341E1, PP9524, PP7011L1, EXACT 5061, LD110.LN, LD100.BW, LD617.LN, PP7011L1, SpectraSyn™ 8 and SpectraSyn™ 10 were all obtained from ExxonMobil Chemical Company (Houston, Tex.). PP7011L1 is a propylene based impact copolymer having 14 wt % rubber. Kraton G 1650, a hydrogenated styrene-butadiene-styrene block copolymer with 28 wt % styrene, was obtained from Kraton Polymers (Houston, Tex.). Properties of these materials are shown in Table 1.

NYGLOS STPO Wollanstonite, a pulverized calcium silicate ($CaSiO_3$) filler, was obtained from Nyco Minerals. ADK Stabilizer FP-2100J is a nitrogen/phosphorous compound obtained from Amfine Chemical Co. Hymond 632SP is a vinyl silane treated $Al(OH)_3$ available from Huber. Vertex 60HST is a fatty acid treated $Mg(OH)_2$ available from Huber. Vertex 90 STI is a fatty acid treated $Mg(OH)_2$ available from Huber.

TABLE 1

| Material | MFR (dg/min) | MI (dg/min) | $M_n$, kg/mole | $M_w$, kg/mole | $T_m$, ° C. | Density, g/cm$^3$ |
|---|---|---|---|---|---|---|
| XM-A* | 2 | 0.9 | 142 | 249 | 44 | 0.858 |
| VM6102 | 3 | | 107 | 228 | 102 | 0.863 |
| PP3155 (PP) | 36 | | 64 | 304 | 169 | 0.900 |
| PP5341E1 (PP) | 0.83 | | 86 | 411 | 164 | 0.900 |
| PP9524 (RCP) | 12 | | 69 | 206 | 143 | 0.900 |
| PP7011L1 (ICP) | 1.0 | | 94 | 386 | 167 | 0.900 |
| Kraton G 1650 (SBC) | <1 | | 88 | 135 | 34 | 0.910 |
| Exact 5061 ($C_2/C_8$) | 0.9 | 0.5 | 60 | 127 | 53 | 0.868 |
| LD110.LN (LDPE) | | 1.1 | 12 | 114 | 111 | 0.918 |
| LD100.BW (LDPE) | | 2 | 18 | 98 | 108 | 0.923 |
| LD617.LN (LDPE | | 26 | 11 | 66 | 112 | 0.919 |

| NFP | $KV_{100}$ (cSt) | Flash point (° C.) | $M_n$, g/mole | VI | Pour Point (° C.) | Specific gravity at 15.6° C. |
|---|---|---|---|---|---|---|
| SpectraSyn ™ 10** | 10 | 266 | 720 | 136 | −54 | 0.835 |
| SpectraSyn ™ 8 | 8 | 641 | | 135 | −54 | 0.833 |

*Propylene ethylene copolymer prepared according to the general procedure in US 2006/0247331 for semi-amorphous polymers and described in the Example section of US 2006/0247331 as semi-amorphous polymer 1 on page 30, Table 1.

Blending

Blends were mixed thoroughly and homogeneously in a batch Brabender mixer heated to 190° C. at a rotor speed of 60 rpm. 0.1 wt % of Irganox™ 2215 (based on the total weight of the polymers) was added when VM6102 or XM-A was one of the polymers or 0.15 wt % Irganox™ 1076 and 0.15 wt % of Irgafox™ 168 was added when Exact 5061 was used in the blends. SpectraSyn™ 10 was then added slowly to prevent pooling in the molten polymer, with the mixing speed slowed to 30-40 rpm. Mixing was continued for 5 min once all the fluid was incorporated in the blend. Finally the blend was discharged from the mixer and allowed to cool down.

Milling

Two-roll mill studies were carried out on a two roll mill from KSBI (Kobelco Stewart Bolling Inc., in Hudson, Ohio 44236) having rolls of 3"×7"×7" (7.6 cm×17.8 cm×17.8 cm) and a speed of from 0 to 27.9 on the front roll and 0 to 39 rpm on the back roll, with a friction ratio of 1.4. The back roll was set to a speed of 39 rpm when we produced the final films or sheets for testing. The blends were ground into small flakes, which were then fed to the two-roll mill. A thermocouple was used to check the roll temperature. The roll temperature was 150° C. Blend compositions and data are reported in Tables A to D below.

TABLE A

Two-Roll Mill Behavior (SS-10 = SpectraSyn™ 10; KV₁₀₀ = 10 cSt)

| Example | Description (wt %) | $t_{min}$, mils | $E_f$, MPa | $T_m$, °C. | Vicat, °C. | MS, N | MFR @ 2.16 kg, dg/min | MFR @ 21.6 kg, dg/min | DMTA Tg, °C. | Tensile Strength MPa | Elongation at break, % | Tensile Toughness, MPa |
|---|---|---|---|---|---|---|---|---|---|---|---|---|
| 1 | EX5061/PP7011/SS-10 = 68/22/10 | 20$^n$ | 13.7 | 48, 159 | 57 |  | 2.0 | 135 | −46 | 9.62 | 880 | 63 |
| 2 | EX5061/PP7011/SS-10 = 76/19/5 | 20$^n$ | 16.4 | 54, 163 | 59 |  | 1.8 | 73 | −44 | 11.6 | 880 | 77 |
| 3 | EX5061/PP7011/SS-10 = 85/10/5 | 17$^n$ | 11.7 | 48, 159 | 58 |  | 1.6 | 64 | −44 | 10.3 | 860 | 63 |
| C4 | EX5061/LD110.LN/SS-10 = 68/22/10 | 50$^{b,r}$ | 20.8 | 42, 102 | 70 | 0.23 | 2.4 | 89 |  | 16.1 | 1100 | 108 |
| C5 | EX5061/LD110.LN/SS-10 = 76/19/5 | 24$^{b,r}$ |  | 47, 103 | 66 | 0.21 | 1.9 | 61 |  | 10.3 | 910 | 71 |
| C6 | EX5061/PP3155/SS-10 = 76/19/5 | 45$^b$ |  | 49, 162 | 60 | O.P. | 2.6 | 150 |  | 15.0 | 850 | 84 |
| C7 | EX5061/PP3155/SS-10 = 85/10/5 | 45$^b$ |  | 53, 164 | 59 | 0.12 | 2.0 | 76 |  | 13.2 | 850 | 72 |
| C8 | EX5061/PP9524/SS-10 = 76/19/5 | 35$^b$ |  | 49, 145 | 60 | O.P. | 2.3 | 104 |  | 15.9 | 880 | 89 |
| C9 | EX5061/PP9524/SS-10 = 85/10/5 | 30$^b$ |  | 53, 147 | 58 | O.P. | 5.3 | 170 | −44 | 12.5 | 840 | 68 |
| C10 | EX5061/PP5341E1/SS-10 = 68/22/10 | 24$^b$ | 13.7 | 48, 157 | 58 | O.P. | 3.1 | 103 | −46 | 13.6 | 890 | 84 |
| C11 | EX5061/PP5341E1/SS-10 = 76/19/5 | 46$^b$ | 14.6 |  | 60 |  | 1.7 | 59 |  | 16.0 | 850 | 88 |
| C12 | EX5061/PP5341E1/SS-10 = 85/10/5 | 34$^b$ | 12.0 |  | 58 |  | 1.9 | 68 |  | 13.7 | 890 | 77 |
| C13 | EX5061/PP5341E1/SS-10 = 80/10/10 | 21$^n$ | 12.1 |  | 59 |  | 1.8 | 66 | −44 | 16.0 | 950 | 92 |
| C15 | EX5061/LD100.BW/SS-10 = 68/22/10 | 28$^r$ | 22.7 | 42, 102 | 68 |  | 1.7 | 64 |  | 17.8 | 1100 | 124 |
| C16 | EX5061/LD100.BW/SS-10 = 76/19/5 | 29$^r$ | 20.3 | 51, 106 | 68 |  | 3.7 | 156 |  | 16.7 | 1000 | 104 |
| C17 | EX5061/LD617.LN/SS-10 = 68/22/10 | 27$^r$ | 23.4 | 43, 104 | 65 |  | 2.2 | 85 |  | 16.3 | 1100 | 115 |
| C18 | EX5061/LD617.LN/SS-10 = 76/19/5 | 28$^r$ | 21.6 | 52, 107 | 66 |  | 5.4 | 160 |  | 16.0 | 1010 | 101 |
| C19 | EX5061/PP3155/KG1650/SS-10 = 76/15/4/5 | 19$^n$ |  | 51, 161 |  |  | 1.7 | 75 | −42 | 14.0 | 850 | 78 |
| C20 | EX5061/PP3155/KG1650/SS-10 = 80/10/5/5 | 31$^b$ |  | 56, 164 | 59 |  | 4.0 | 160 |  | 9.67 | 310 | 15 |
| C21 | EX5061/PP9524/KG1650/SS-10 = 76/15/4/5 | 35$^b$ |  | 49, 145 | 58 |  | 2.3 | 99 |  | 10.7 | 360 | 19 |
| C22 | EX5061/PP9524/KG1650/SS-10 = 80/10/5/5 | 37$^b$ |  | 54, 147 | 58 |  | 3.0 | 125 |  | 10.5 | 380 | 19 |
| C23 | XM-A/PP7011/SS-10 = 81/14/5 | 22$^b$ | 14.3 | 33, 161 | 47 |  | 5.8 | 200 | −24 | 9.82 | 940 | 65 |
| C24 | VM6102/PP7011/SS-10 = 81/14/5 | 30$^b$ | 12.1 | 163 | 44 |  | 1.7 | 59 | −24 | 10.1 | 1100 | 76 |

MS: Melt strength at 150° C.;
$E_f$: 1% secant modulus;
$^n$Narrowest nip;
$^b$Below which back roll band formation occurs;
$^r$Very rough surface;
O.P.: Over-pressured (Some compounds in Table A were too viscous at 150° C. so that no filament was extruded from the capillary rheometer in the Göttfert Rheotens. We termed the melt strength as O.P. (over-pressured)).

TABLE B

| Ingredient (wt %) | Specific Material | 10-1 | 22-3 | 10-2 | 34-1 | 15-1 | 15-2 | 34-2 | 34-3 |
|---|---|---|---|---|---|---|---|---|---|
| Plastomer | Exact 5061 | 70 | 68 | 54 | 45 | 54 | 54 | 45 | 40 |
| ICP | PP7011L1 | 10 | 8 | 6 | 20 | 6 | 6 | 15 | 20 |
| NFP | SpectraSyn™ 8 | 10 | 10 | 20 | 20 | 20 | 20 | 20 | 20 |
| Flame Retardant | FP-2100J | 10 | 14 | 20 | 15 | 0 | 0 | 0 | 0 |
| Flame Retardant | Hymond 632SP | 0 | 0 | 0 | 0 | 20 | 0 | 0 | 0 |
| Flame Retardant | Vertex 60HST | 0 | 0 | 0 | 0 | 0 | 20 | 20 | 20 |
| Flame Retardant | Vertex 90STI | 0 | 0 | 0 | 0 | 0 | 0 | 0 | 0 |
| Flame Retardant | SCPX-2970 | 0 | 0 | 0 | 0 | 0 | 0 | 0 | 0 |
| Film Thickness | $t_{min}$, mils | 24 | 21 | 40 | 23 | 29 | 20 | 38 | 26 |
| Tensile Strength | MPa | 12.5 | 11.6 | 9.22 | 7.81 | 6.59 | 9.56 | 7.84 | 4.41 |
| Elongation at Break | % | 1000 | 950 | 1100 | 980 | 930 | 1,100 | 970 | 700 |
| Toughness | MPa | 83 | 70 | 66 | 58 | 46 | 64 | 56 | 18 |
| $T_m$ | °C. | 160 | 159 | 156 | 157 | 160 | 156 | 160 | 157 |
| MFR @ 2.16 kg | dg/min | 1.3 | 1.5 | 6.3 | 4.6 | 4.7 | 4.1 | 4.5 | 5.4 |
| MFR @ 21.6 kg | dg/min | 92 | 239 | 415 | 90 | 365 | 260 | 370 | 486 |
| Flammability | mm/min | 40** | 55* | 47** | 65* | 56* | 55* | 48* | 56* |

| Ingredient (wt %) | Specific Material | 34-4 | 22-1 | 15-3 | 34-5 | 34-6 | 34-7 | 22-2 |
|---|---|---|---|---|---|---|---|---|
| Plastomer | Exact 5061 | 40 | 60 | 54 | 45 | 40 | 40 | 60 |
| ICP | PP7011L1 | 20 | 6 | 6 | 15 | 20 | 20 | 6 |
| NFP | SpectraSyn™ 8 | 20 | 20 | 20 | 20 | 20 | 20 | 20 |
| Flame Retardant | FP-2100J | 0 | 0 | 0 | 0 | 0 | 0 | 0 |
| Flame Retardant | Hymond 632SP | 0 | 0 | 0 | 0 | 0 | 0 | 0 |
| Flame Retardant | Vertex 60HST | 16 | 10 | 0 | 0 | 0 | 0 | 0 |
| Flame Retardant | Vertex 90STI | 0 | 0 | 20 | 20 | 20 | 16 | 10 |
| Flame Retardant | SCPX-2970 | 4 | 4 | 0 | 0 | 0 | 4 | 4 |
| Film Thickness | $t_{min}$, mils | 31 | 36 | 25 | 40 | 92 | 104 | 35 |

TABLE B-continued

| | | | | | | | | |
|---|---|---|---|---|---|---|---|---|
| Tensile Strength | MPa | 5.50 | 6.45 | 10.7 | 7.50 | 7.04 | 6.76 | 9.81 |
| Elongation at Break | % | 920 | 800 | 1100 | 970 | 880 | 950 | 1040 |
| Toughness | MPa | 48 | 42 | 71 | 58 | 59 | 55 | 64 |
| $T_m$ | °C. | 159 | 160 | 159 | 157 | 160 | 158 | 161 |
| MFR @ 2.16 kg | dg/min | 4.6 | 3.7 | 5.2 | 5.7 | 4.9 | 6.2 | 3.9 |
| MFR @ 21.6 kg | dg/min | 422 | 226 | 305 | 425 | 512 | 452 | 248 |
| Flammability | mm/min | 63* | 71* | 59* | 54* | 44* | 35** | 79** |

*Average of 2 measurements
**Single measurement because of material shortage

TABLE C

| Ingredient (wt %) | Specific Material | Ex5061 | 10-1 | 22-3 | 34-1 | 15-2 | 15-3 | 10-1 | 22-3 | 34-1 |
|---|---|---|---|---|---|---|---|---|---|---|
| Plastomer | Exact 5061 | 100 | 70 | 68 | 45 | 54 | 54 | 70 | 68 | 45 |
| Impact Copolymer | PP7011L1 | 0 | 10 | 8 | 20 | 6 | 6 | 10 | 8 | 20 |
| NFP | SpectraSyn™ 8 | 0 | 10 | 10 | 20 | 20 | 20 | 10 | 10 | 20 |
| Filler | Wollastonite | 0 | 0 | 0 | 0 | 0 | 0 | 0 | 0 | 0 |
| Flame Retardant | FP-2100J | 0 | 10 | 14 | 15 | 0 | 0 | 10 | 14 | 15 |
| Flame Retardant | Vertex 60HST | 0 | 0 | 0 | 0 | 20 | 0 | 0 | 0 | 0 |
| Flame Retardant | Vertex 90STI | 0 | 0 | 0 | 0 | 0 | 20 | 0 | 0 | 0 |
| Total Raw Material | | 100 | 100 | 100 | 100 | 100 | 100 | 100 | 100 | 100 |
| Calendared or Compression Molded Film | Cal/Comp | Comp | Cal | Cal | Cal | Cal | Cal | Comp | Comp | Comp |
| Film Thickness | $t_{min}$, mils | | 24 | 21 | 23 | 20 | 25 | 126 | 125 | |
| Melt Index @ 190 C. | dg/min. | 0.868 | | | | | | 0.34 | 0.35 | 2.47 |
| Tensile Strength-MD | MPa | 10 | 13 | 12 | 8 | 10 | 11 | 7.8 | 6.6 | 3.8 |
| Elongation Break-MD | % | 900 | 1,000 | 950 | 980 | 1,100 | 1,100 | 1,011 | 1,010 | 1,010 |
| Tear-MD | kg/cm | | 83 | 70 | 58 | 64 | 71 | | | |
| $T_m$ | °C. | 53 | 160 | 159 | 157 | 156 | 159 | 160 | 160 | 159 |
| Flammability | mm/min | >102 | 40 | 55 | 65 | 55 | 59 | | | |

TABLE D

| Ingredient (wt %) | Specific Material | Ex5061 | 15-2 | 15-3 | Ex1 | Ex2 | Ex3 | Ex4 | Ex5' |
|---|---|---|---|---|---|---|---|---|---|
| Plastomer | Exact 5061 | 100 | 54 | 54 | 70 | 65 | 60 | 60 | 55 |
| Impact copolymer | PP7011L1 | 0 | 6 | 6 | 10 | 10 | 10 | 10 | 20 |
| NFP | SpectraSyn™ 8 | 0 | 20 | 20 | 0 | 10 | 10 | 10 | 10 |
| Filler | Wollastonite | 0 | 0 | 0 | 0 | 0 | 0 | 0 | 0 |
| Flame Retardant | FP-2100J | 0 | 0 | 0 | 0 | 0 | 0 | 0 | 15 |
| Flame Retardant | Vertex 60HST | 0 | 20 | 0 | 0 | 0 | 0 | 20 | 0 |
| Flame Retardant | Vertex 90STI | 0 | 0 | 20 | 20 | 15 | 20 | 0 | 0 |
| Total Raw Material | | 100 | 100 | 100 | 100 | 100 | 100 | 100 | 100 |
| Calendared or Compression Molded Film | Cal/Comp | Comp | Comp | Comp | Comp | Comp | Comp | Comp | Comp |
| Melt Index @ 190 C. | dg/min. | 0.868 | 0.39 | 2.05 | 0.29 | 0.52 | 0.80 | 0.87 | 1.73 |
| Tensile Strength-MD | MPa | 10 | 7.1 | 6.8 | 7.3 | 7.4 | 6.2 | 6.2 | 4.2 |
| Elongation Break-MD | % | 900 | 1,010 | 1,010 | 1,010 | 1,010 | 1,010 | 1,010 | 1,010 |
| $T_m$ | °C. | 53 | 157 | 157 | 162 | 161 | 160 | | |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A film having a thickness of from 0.5 to 35 mils (12.7 to 889 microns) comprising a blend composition comprising:
   a) 4 to 50 wt %, based upon the weight of the composition, of one or more polypropylene-based TPO(s) comprising at least 50 wt % propylene and at least 10 wt % ethylene having a melt flow rate (MFR) of 7 dg/min or less, a Tm of 150° C. or more, and a lowest Tg of −30° C. or less; and b) 30 to 80 wt %, based upon the weight of the composition, of one or more ethylene plastomer(s) having a melt index of 3 dg/min or less and a density of 0.869 to 0.910 g/cc; and c) 0.5 to 35 wt %, based upon the weight of the composition, of one or more non-functionalized plasticizer(s) having a kinematic viscosity at 100° C. of 4 to 300 cSt, a pour point of −20° C. or less, and a flash point of 200° C. or more; and d) 0 to 69.5 wt %, based upon the weight of the composition, of one or more filler(s);

said blend composition having:
i) a tensile strength of 7 MPa or more, and
ii) an elongation at break in the machine and transverse directions of 400% or more, and
iii) a flexural modulus of 50 MPa or less, and
iv) Vicat softening point of 50° C. or more, and
v) a highest Tm of 145° C. or more, and
vi) a Roll Change Point of 5 to less than 29 mils (127 to 737 microns); and
wherein the blend composition is calendered into a film having a thickness of 0.5 to 35 mils (12.7 to 889 microns).

2. The film or sheet of claim 1, wherein the blend composition has two melting points as measured by DSC, the first being at least 145° C. and the second being at least 40° C., where the two Tm's are at least 20° C. apart.

3. The film or sheet of claim 1, wherein the blend composition has a Tear Strength of 45 kg/cm or more.

4. The film or sheet of claim 1, wherein the blend composition has an equal or better scratch resistance rating as compared to the same blend composition without NFP.

5. The film or sheet of claim 1, wherein the blend composition has a scratch resistance rating of 3 N or more.

6. The film or sheet of claim 1, wherein the filler is an inorganic mineral filler with a median particle diameter of 0.1 to 100 microns and or an aspect ratio of greater than 1.2.

7. The film or sheet of claim 1, wherein the filler is selected from the group consisting of mineral aggregates, fibers, carbon black, graphite, wollastonite, clays, sand, and glass beads.

8. The film or sheet of claim 1, wherein the polypropylene-based TPO comprises a matrix having a $T_m$ of 110° C. or more and a dispersed phase having a $T_g$ of −20° C. or less.

9. The film or sheet of claim 1, wherein the propylene based TPO is one or more in-situ ICP(s).

10. The film or sheet of claim 1, wherein the ethylene plastomer has an ethylene content of 60 to 96 wt %.

11. The film or sheet of claim 1, wherein the ethylene plastomer has a density of 0.91 to 0.86 g/cm$^3$.

12. The film or sheet of claim 1, wherein the NFP is a polyalphaolefin.

13. The film or sheet of claim 1, wherein the NFP is a mixture of $C_{20}$ to $C_{120}$ paraffins, 50 wt % or more being isoparaffinic hydrocarbons and less than 50 wt % being hydrocarbons that contain naphthenic and/or aromatic structures.

14. The film or sheet of claim 1, wherein the filler is a flame retardant filler.

15. The film or sheet of claim 1, wherein the polypropylene-based TPO is present at 6 to 20 wt % and has a melting point, Tm, of 155° C. or more; the ethylene based plastomer is present at 40 to 70 wt % and has a density of 0.862 to 0.87 g/cc; the non-functionalized plasticizer(s) is present at 0.5 to 15 wt % and has a viscosity index of 100 or more and a specific gravity of 0.88 or less; and the filler is present at 5 to 20 wt %.

16. A process to make a film or sheet having a thickness of from 0.5 to 35 mils (12.7 to 889 microns) comprising:

1) combining:
a) 4 to 50 wt %, based upon the weight of the composition, of a polypropylene-based TPO comprising at least 50 wt % propylene and at least 10 wt % ethylene, having an MFR of 10 dg/min or less, a Tm of 150° C. or more, and a lowest Tg of −30° C. or less; and b) 30 to 80 wt %, based upon the weight of the composition, of an ethylene plastomer having a melt index of 3 dg/min or less and a density of 0.860 to 0.91 g/cc; and c) 0.25 to 35 wt %, based upon the weight of the composition, of one or more non-functionalized plasticizer(s) having a kinematic viscosity at 100° C. of 4 to 300 cSt, a pour point of −20° C. or less, and a flash point of 200° C. or more; and d) 0 to 69.5 wt %, based upon the weight of the composition, of one or more filler(s); to form a blend; and 2) calendering the blend between at least two calendering rolls at a temperature of 80° C. to 220° C., said rolls having a nip distance of about 1 to about 50 mils (25.4 to 1270 microns) where the blend has:
i) a tensile strength (Machine Direction) of 7 MPa or more; and
ii) an elongation at break (Transverse and/or Machine Direction) of 400% or more; and
iii) a flexural modulus of 50 MPa or less; and
iv) a Vicat softening temperature of 50° C. or more; and
v) a highest Tm of 145° C. or more; and
vi) a Roll Change Point of 5 to less than 29 mils (127 to 737 microns); and 3) wherein the blend composition is calendered into a film or sheet having a thickness of 0.5 to 35 mils (12.7 to 889 microns).

17. The process of claim 16, wherein the friction ration between the first and second rolls in the calender is about 1.0 to about 2.0.

18. The process of claim 16, wherein the blend has a Roll Change Point of 10 to 25 mils (254 to 635 microns).

19. The process of claim 16, wherein the blend has a Roll Change Point of 15 to 22 mils (381 to 559 microns).

20. The process of claim 16, wherein the blend is calendered into a film or sheet having a thickness of 2 to 30 mils (51 to 762 microns).

21. The process of claim 16, wherein the blend is calendered into a film or sheet having a thickness of 20 to 25 mils (508 to 635 microns).

22. The process of claim 16, wherein the blend composition has two melting points as measured by DSC, the first being at least 145° C. and the second being at least 40° C., where the two Tm's are at least 20° C. apart and the blend composition has a Tear Strength of 45 kg/cm or more.

23. The process of claim 16, wherein the blend composition has an equal or better scratch resistance rating as compared to the same blend composition without NFP.

24. The process of claim 16, wherein the blend composition has a scratch resistance rating of 3 N or more.

25. The process of claim 16, wherein the polypropylene-based TPO is an in-situ TPO, is present at 6 to 20 wt % and has a Tm of 155° C. or more; the ethylene based plastomer is present at 40 to 70 wt % and has a density of 0.862 to 0.87 g/cc; the non-functionalized plasticizer(s) is present at 0.5 to 15 wt % and has a viscosity index of 100 or more and a specific gravity of 0.88 or less; and the filler is present at 5 to 20 wt %.

* * * * *